US007878392B2

(12) United States Patent
Mayers et al.

(10) Patent No.: US 7,878,392 B2
(45) Date of Patent: Feb. 1, 2011

(54) TRACKING REMOVAL OR PROCESSING OF DEBRIS MATERIAL

(75) Inventors: Scott A. Mayers, Lutz, FL (US); Darius J. Stankunas, Tampa, FL (US)

(73) Assignee: HaulPass, LLC, Tampa, FL (US)

( * ) Notice: Subject to any disclaimer, the term of this patent is extended or adjusted under 35 U.S.C. 154(b) by 673 days.

(21) Appl. No.: 11/893,774

(22) Filed: Aug. 17, 2007

(65) Prior Publication Data

US 2008/0041948 A1    Feb. 21, 2008

Related U.S. Application Data

(60) Provisional application No. 60/838,920, filed on Aug. 18, 2006.

(51) Int. Cl.
*G06F 17/00* (2006.01)
(52) U.S. Cl. ........................................ 235/375; 235/385
(58) Field of Classification Search ................. 235/384, 235/385, 493; 340/539.13, 539.18, 568.1, 340/572.1
See application file for complete search history.

(56) References Cited

U.S. PATENT DOCUMENTS

| | | | |
|---|---|---|---|
| 5,431,347 A | 7/1995 | Hayashi et al. | |
| 6,574,561 B2 | 6/2003 | Alexander et al. | |
| 6,982,640 B2* | 1/2006 | Lindsay et al. | 340/540 |
| 6,995,673 B1* | 2/2006 | Osredkar et al. | 235/384 |
| 6,999,876 B2 | 2/2006 | Lambert et al. | |
| 7,089,110 B2 | 8/2006 | Pechatnikov et al. | |
| 7,107,285 B2 | 9/2006 | von Kaenel et al. | |
| 7,246,009 B2* | 7/2007 | Hamblen et al. | 340/988 |
| 2002/0125315 A1 | 9/2002 | Ogawa | |
| 2003/0014334 A1 | 1/2003 | Tsukamoto | |

OTHER PUBLICATIONS

Chen-Yang Cheng and Vittal Prabhu, "Applying RFID for Cutting Tool Supply Chain Management," [online] [retrieved on Jul. 26, 2007] Retrieved from the Internet: <URL: http://psserie.psu.edu/outreach/rfid/Documents/VittalRFIDresearch.pdf > 9 pages.

(Continued)

*Primary Examiner*—Thien M Le
(74) *Attorney, Agent, or Firm*—Fish & Richardson P.C.

(57) ABSTRACT

A method of performing debris clean-up following a disaster event can include creating an electronic load ticket for a pre-registered debris transporter to transport a load of debris from a site of debris origin to a site where the load of debris is to be emptied from the transporter; following transport of the load of debris to the second site, reading, from the electronic information storage device and to a portable computing device, the information uniquely identifying the debris transporter and the electronic load ticket; and upon verification that no alteration has been made to the transporter, receiving at the portable computing device information describing the load of debris that has been transported. In some implementations, the electronic load ticket includes information identifying the geographic location of debris origin, and is electronically stored on a portable electronic information storage device that contains information uniquely identifying the debris transporter.

19 Claims, 27 Drawing Sheets

OTHER PUBLICATIONS

Geo Age—Applications "We have a faster way to get the information you need," [online] [retrieved on Jul. 26, 2007] Retrieved from the Internet: <URL: http://www.geoage.com/pdf/GeoAgeApplication.pdf> 2 pages.

GeoAge—Field Adapted Survey Toolkit (FAST) [online] [retrieved on Jul. 26, 2007] Retrieved from the Internet: <URL: http://www.geoage.com/fast.html> 1 page.

GeoAge—Flexible Data Collection Software [online] [retrieved on Jul. 7, 2007] Retrieved from the Internet: <URL: http://www.geoage.com/pdf/GeoAgeFAST3.pdf > 1 page.

GeoAge—GPS Tracking "Real-Time GPS Tracking of Mobile Devices," the information you need, [online] [retrieved on Jul. 26, 2007] Retrieved from the Internet: <URL: http://www.geoage.com/geoagegpstracking.html> 1 page.

GeoAge—Mobile Computing Hardware "We have a faster way to get the information you need,"[online] [retrieved on Jul. 26, 2007] Retrieved from the Internet: <URL: http://www.geoage.com/hardware.html > 1 page.

GeoAge—Mobile Solutions "We have a faster way to get the information you need," [online][retrieved on Jul. 26, 2007] Retrieved from the Internet: <URL: http://www.geoage.com/products.html > 1 page.

GeoAge—Rapid Mobile Automation, [online] [retrieved on Jul. 26, 2007] Retrieved from the Internet: <URL: http://www.geoage.com, 1 page.

GeoAge—Tracking "Mobile GPS Tracking & Navigation," [online] [retrieved on Jul. 26, 2007] Retrieved from the Internet: <URL: http://www.geoage.com/pdf/GeoAgeGPSTracking.pdf> 1 page.

Hitachi Software—GIS, Press Release Oct. 15, 2002, 2 pages.

Visual Records Storm Tracker Brief [online] [retrieved Jul. 18, 2007] Accessible from the Internet: <URL www.visualrecords.com 1 page.

Visual Records Storm Tracker Brochure [online] [retrieved Jul. 18, 2007] Accessible from the Internet: <URL www.visualrecords.com 5 pages.

Visual Records Storm Tracker Mapping Module Product Tour [online] [retrieved Jul. 18, 2007] Accessible from the Internet: <URL www.visualrecords.com 12 pages.

Wikipedia—Geographic Information System [online] [retrieved on Jul. 23, 2007] Retrieved from the Internet 19 pages.

"Through New Automated Technology, Beck Disaster Recovery Aims to Eliminate Post-Disaster Fraud," Beck Disaster Recovery, Inc. Press Release, Oct. 19, 2006, 2 pages.

AshBritt—[online] [retrieved Sep. 18, 2007] Accessible from the Internet: <URL http://www.ashbritt.com > 24 pages.

Phillips and Jordan—Disaster Recovery [online] [retrieved Sep. 9, 2007] Accessible from the Internet: <URL http://pandj.com/Menu/Services/DisasterRecovery.aspx > 2 pages.

Debris EZ, "We have picked up the debris; now where's our money?" white paper, believed to be electronically dated Jan. 25, 2007, 2 pages.

* cited by examiner

TRACKING REMOVAL OR PROCESSING OF DEBRIS MATERIAL

CROSS-REFERENCE TO RELATED APPLICATIONS

This application claims priority to U.S. Provisional Application Ser. No. 60/838,920, filed Aug. 18, 2006, the entire contents of which are herein incorporated by reference.

TECHNICAL FIELD

This document relates to tracking the removal or processing of material, such as debris material.

BACKGROUND

In various situations, material is removed from a site or otherwise processed. For example, following a natural disaster, such as a hurricane or tornado, debris of various kinds may be removed from public areas (e.g., streets, roads, other rights-of-way, parks and other public spaces) and appropriately processed (e.g., vegetative material may be chipped or shredded; displaced and destroyed automobiles, water craft and appliances may be salvaged, etc.). As another example, a site clean-up operation may include the removal of contaminated soil or hazardous items, such as unexploded ordinance, hazardous chemicals, radioactive material, etc., from a particular location (e.g., a former industrial site or military installation) and appropriate subsequent processing of the unwanted material (e.g., the contaminated soil may be neutralized, unexploded ordinance may be safely detonated, hazardous chemicals or radioactive material may be neutralized or safely packaged for long term storage or disposal, etc.). As another example, bulk materials, such as dirt, clay, stone or other material may be moved from one location to another.

Various entities may be involved in processing or removal of unwanted materials, and other, different entities may pay for at least a portion of the processing or removal of the unwanted materials. For example, following a natural disaster, such as a hurricane or tornado, individual municipal entities (e.g., towns, cities, villages or counties) may be responsible for processing debris located within their boundaries, but the municipal entities may receive at least some funding for the removal or processing effort from a state or federal government agency (e.g., the Federal Emergency Management Agency (FEMA)). As another example, an entity that is reclaiming a former military site (e.g., the Department of Defense, the Army, etc.) may coordinate removal and/or safe disposal of unexploded ordinance, hazardous chemicals or contaminated soil, but the state may receive funding from the Department of Defense or the Environmental Protection Agency.

SUMMARY

Systems and methods are described that can track the transportation of material from a site of material origin to a disposal site. As one example application, the described systems and methods can be employed to track debris clean-up following a natural disaster. In some implementations, an electronic load ticket can be created for a pre-registered debris transporter to transport a load of debris from a site of debris origin to a second site where the load of debris is to be emptied from the transporter. The electronic load ticket can include information identifying the geographic location of debris origin, and can be electronically stored on a portable electronic information storage device that contains information uniquely identifying the debris transporter. Following transport of the load of debris to the second site, the information uniquely identifying the debris transporter and the electronic load ticket can be read from the electronic information storage device to a portable computing device. Upon verification that no alteration has been made to the transporter, information describing the load of debris that has been transported can be received at the portable computing device information.

In some implementations, a computer-implemented method of tracking transportation of material from a plurality of material origination sites to one or more material disposal sites can include receiving at a central database and at multiple different times, a plurality of electronic load tickets and corresponding electronic disposal confirmations. Each electronic load ticket can identify material that has been transported from a site of material origination to a disposal site and a geographic location of the site of material origination. Each corresponding electronic disposal confirmation can identify a quantity of material transported from the site of material origination to the disposal site and a type classification for the material. A graphical representation of material transported from the plurality of material origination sites to the one or more disposal sites, can be provided, for display at a user device, based on the received plurality of electronic load tickets and corresponding electronic disposal confirmations.

Some implementations can provide one or more of the following advantages. An electronic system can replace various activities associated with a debris clean-up operation that have previously been paper-based. Data entry costs can be reduced. Load ticket manifesting costs can be reduced. Delays in dealing with compromised communication networks can be reduced. Quality assurance, quality control, and auditing costs can be reduced. The number of different possibilities for fraud can be reduced, as can the overall likelihood that fraud will go undetected. Data storage costs can be reduced. Efficiencies in managing a clean-up operation can be realized. Various stakeholders in a clean-up operation can receive necessary information in an appropriate format sooner and can be paid sooner.

DESCRIPTION OF DRAWINGS

FIGS. 5A-5B illustrate example interfaces for certifying vehicles and employees, respectively.

FIG. 10A illustrates an example summary report for a particular disposal site.

DETAILED DESCRIPTION

This document describes systems and methods that can be employed to track removal or processing of various material, such as, for example, debris material or other unwanted material. In particular, the described systems and methods can be employed to administer a debris clean-up operation by tracking people and resources used in the operation; and by receiving, storing and analyzing information about the operation in a manner that facilitates planning, auditing and paying for the operation.

Figure 1:
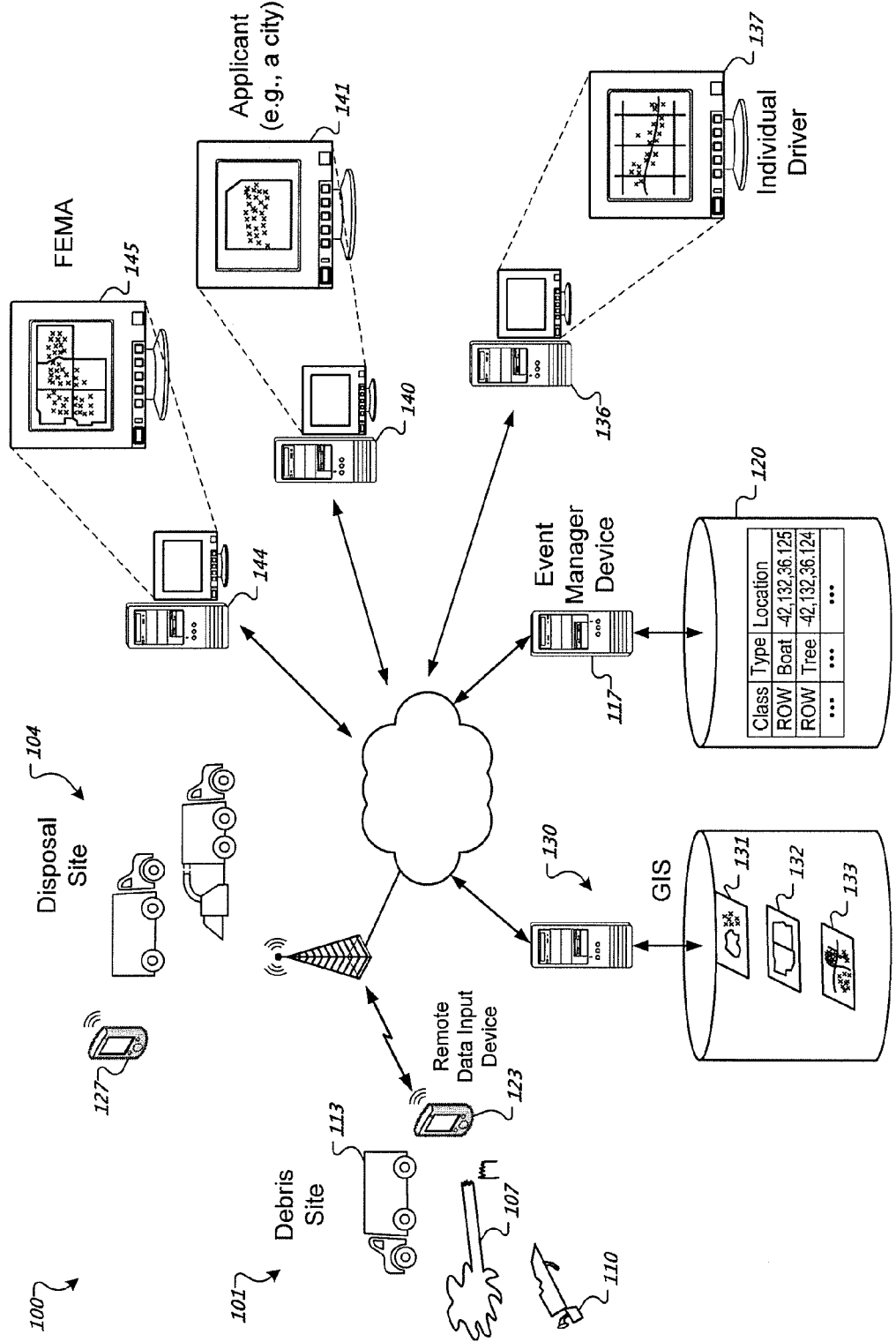
FIG. 1 depicts an environment in which debris at a debris site can be processed and various components of a system that can be employed to track the processing of the debris.

FIG. 1 depicts an environment 100 in which unwanted material at a debris site 101 can be processed (e.g., transported to a disposal site 104 for appropriate processing or disposal). FIG. 1 also shows various components of a system that can be employed to track the processing of the debris. For purposes of illustration, debris items that may have resulted from a natural disaster, such as a hurricane or tornado (e.g., a downed tree 107 or destroyed boat 110) are depicted, but the systems and methods described in this document can be applied to processing or removal of other types of unwanted material (e.g., contaminated soil, unexploded ordinance, hazardous chemicals, radioactive material, scrap metal, etc.).

In the particular example scenario depicted in FIG. 1, the debris at the debris site 101 can be picked up by various haulers, one of which is depicted as hauler 113, and transported to the disposal site 104, where the debris can be further processed. For example, vegetative material, such as downed trees, branches or shrubs can be shredded or chipped, or converted to lumber or firewood; boats, automobiles or appliances (e.g., white goods) can be disassembled, recycled, crushed, or otherwise disposed of or stored at the disposal site 104.

In many scenarios, it is advantageous to be able to precisely track processing or removal of individual debris items. For example, precise tracking of the processing or removal of debris items can facilitate efficient planning and coordination of an overall clean-up operation. Moreover, precise tracking may be necessary in order for an entity that carries out the processing or removal of debris items to be paid for its work. In particular, for example, various private entities (e.g., hauling contractors and subcontractors) may be hired by a municipality to clean up an area following a hurricane or tornado, but may be paid, at least in part, by a different entity, such as a state government or federal agency (e.g., FEMA). In order for the private entities to be paid, the payors (e.g., FEMA) may require precise documentation and tracking of the overall debris removal and processing effort.

An electronic system for tracking a debris removal or processing operation can be particularly advantageous. In particular, the example electronic systems described in this document can minimize the possibility for fraud in debris processing operations, the systems can facilitate electronic tracking of debris processing operations even when a primary communications infrastructure near the debris site is either not available or has been destroyed or rendered inoperable (e.g., by a debris-causing event), the systems can facilitate dynamic reporting of status of the debris processing operation to various stakeholders in the operation, and the systems can eliminate paper tracking of various steps of a debris clean-up operation that may otherwise be employed. Various components of an example tracking system are now described with continued reference to FIG. 1.

In some implementations, a tracking system includes a central event manager device 117 that receives various data related to a debris processing operation, stores the information in a corresponding storage device 120 (e.g., a data store, database system, table, etc.), analyzes the stored information, and provides it for display to various user devices that connect to the central event manager device 117. The central event manager device 117 can be, for example, a computer, a server, or a number of networked and/or distributed computers or servers.

The event manager device 117 can receive data from various remote date input devices such as input devices 123 and 127. For purposes of illustration, the remote date input devices 123 and 127 are depicted as personal digital assistants (PDAs), but other computing or communication devices can be employed, such as, for example, laptop computers or smartphones. Different input devices can serve different purposes, and in particular, can track different phases of a debris processing operation. For example, the input device 123 can be equipped with GPS functionality and can be used to initially tag, at the debris site 101, individual debris items that require processing, such as, the tree 107 or the boat 110. As one example, the tag can be an electronic record that captures various information about the specific debris items, such as a classification (e.g., a downed tree, vegetative matter, a boat, an automobile, or other common debris classification, such as leaners, hangers, whitegoods, etc.), and a location of the debris item. In some implementations, the tag can be a load ticket that documents the removal or processing at the time a debris item is removed or processed, and later facilitates payment to the hauler or processor for the processing or removal.

Location can be specified in various ways and with various levels of precision. For example, a location can be specified with reference to the nearest street intersection; the location could be specified with a latitude/longitude coordinate having an approximate precision of 50 feet (e.g., precise to within 25 to 75 feet); the location could be specified with a property address; the location could be specified to a particular workzone (e.g., defined by an administrator of a clean-up operation and relative to a Geographic Information System (which is explained in greater detail below)); or the location could be specified in some other manner.

Location of debris items can be specified with different precisions at different points in a debris processing operation. For example, following a natural disaster, such as a hurricane or tornado, an initial assessment team may fly over the resulting debris field and estimate an overall classification and quantity of debris items in the debris field and may only roughly specify the location of the various debris items (e.g., with a precision of a minute, or several seconds of latitude/longitude (i.e., $\frac{1}{60}^{th}$ of a degree, or $\frac{1}{3600}^{th}$ of a degree, respectively) or with reference to a major nearby intersection). Subsequently, when debris items are removed from the debris field or otherwise processed, a load ticket (which is described in greater detail with reference to FIG. 1B) may be generated and may have a much greater precision (e.g., approximately 50 feet).

Initial information about debris items in a debris field that is collected by the input device 123 can be communicated to the event manager device 117 in various ways. In one implementation, in which a communication network (e.g., a wireless network (satellite, microwave, cellular, shortwave, etc.) or wired communication network (plain old telephone system, (POTS), internet, fiber optic network, etc.)) is available, information about individual debris items can be communicated to the event manager device 117 as soon as the information is available, or at multiple different times (e.g., every 15 minutes, 30 minutes, 2 hours, 8 hours, etc.). In another implementation, in which a communication network is not available, information about individual debris items can be stored in the input device 123 until a communication network is available to the input device 123. For example, in the context of a debris clean-up operation following a natural disaster that rendered inoperable traditional communication facilities, debris clean-up personnel can employ input devices to gather data regarding debris items throughout each day, then transport the input devices in the evening to a location having a communications network (e.g., satellite or microwave truck at a disaster recovery control site, or an area unaffected by the debris-causing event that is near the debris field).

Other input devices can be employed at locations other than the debris site 101. For example, as depicted in FIG. 1, an input device 127 can be employed at a disposal site 104. In particular, the input device 127 can be employed to generate load disposal confirmations, which are described in greater detail with to FIG. 1B. The load disposal confirmations, possibly in conjunction with a corresponding load ticket generated at the debris site 101 by the input device 123, can confirm that a specific debris item referenced by the load ticket was in fact removed from the debris field or otherwise processed. Information that is captured by the input device 127 at the disposal site 104 can also be communicated to the event manager device 117.

By regularly receiving data from various input devices, such as the input devices 123 and 127, the event manager device 117 can track overall status of a debris removal or processing operation. In addition, the event manager device 117 can provide status to various other devices. In some implementations, status information can be formatted graphically—for example, as symbols that are displayed on a map that depicts the debris field. In particular, as load ticket information is received by the event manager device 117, a graphic depicting the particular type of debris item can be added to an appropriate location on the map; when a corresponding load disposal confirmation is received by the event manager device 117, the graphic on the map can be updated (e.g., changed to a different color or shape) to indicate that the corresponding debris item was processed. In this manner, the map can be dynamically updated to reflect cumulative progress of a debris processing event.

To provide status information graphically and relative to a map of the debris field, the event manager device 117 can be configured to receive map data from another system, such as a geographic information system (GIS) 130. In some implementations, the GIS 130 is a third-party system containing various geospatial information. In other implementations (not shown), a GIS subsystem is included in the event manager device 117. The geospatial information can be stored in multiple layers, each of which can be selectively included to display different kinds of geospatial detail. For example, as depicted in FIG. 1, the GIS 130 may include a layer 131 that depicts hydrology and/or topology features. Another layer 132 may depict municipal boundaries, such as borders of towns, villages or cities; county lines; state lines; etc. By combining the layers 131 and 132, the information on each layer can be overlaid to provide a depiction of the municipal boundaries relative to the topographic or geological features shown in the layer 131. A third layer 133 may capture street and road data. Various other layers (not shown), can be provided by the GIS 130, such as layers for displaying township or section data (or other data stored in the Public Land Survey System, or PLSS).

By interfacing with the GIS 130, the event manager device 117 can track debris items information relative to the geospatial information in the GIS 130. In particular, in some implementations, the event manager device 117 can combine debris item data stored in the event database 120 with corresponding geospatial information stored in the GIS 130 to provide a graphical representation of the debris processing operation. More particularly, the event manager device 117 can graphically represent a current state of the debris field (e.g., an indication of cumulative debris processing that has occurred), overlaid on a map with various other geospatial detail, by initially showing all of the debris items initially identified, and removing individual debris items from the graphical display as those debris items are processed (e.g., as evidenced, in some implementations, by a load disposal confirmation received from the input device 127).

In some implementations, the event manager device 117 is configured to prepare and provide different graphical representations of a debris field to different user devices, depending, for example, on a responsibility or role a user associated with the user device has in processing debris items in the debris field. For example, a user device 136 may be associated (e.g., through particular login information from a network-connected computer device) with a specific hauler (e.g., the hauler 113), and the graphical representation 137 provided by the event manager device 117 may be specific to a clean-up route that is assigned to that hauler. As another example, a user device 140 may be associated with a specific municipality affected by a debris-causing event, and the graphical representation 141 provided by the even manager device 117 to the user device 140 may be specific to that municipality. As another example, a user device 144 may be associated with a government agency (e.g., FEMA) that is involved in the debris processing operation (e.g., by funding a portion of the clean-up), and the graphical representation 145 may provide information for a wider area than a single municipality or hauling route.

Figure 2:
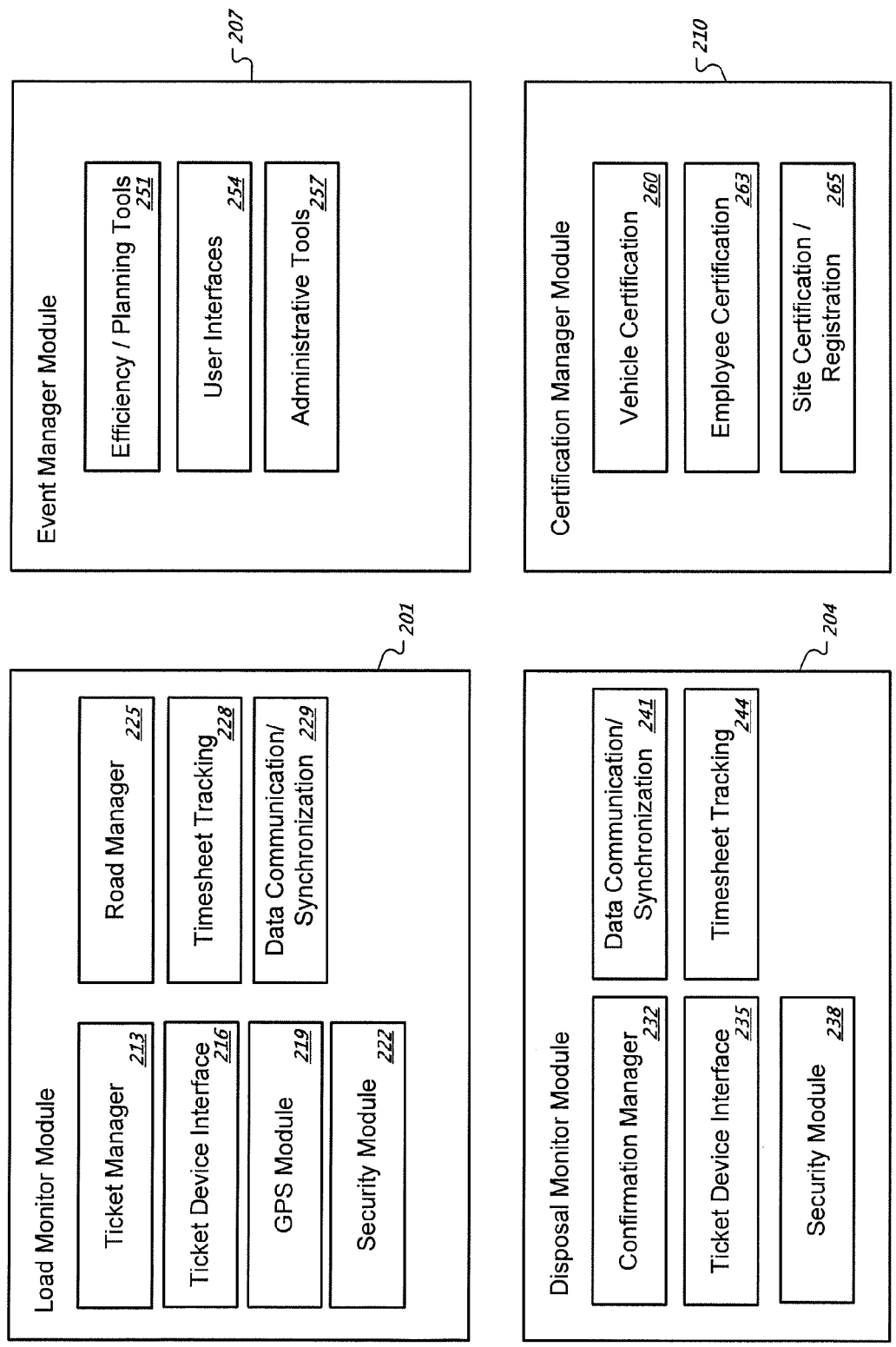
FIG. 2 illustrates additional details of an example system that can track debris processing.

FIG. 2 is a block diagram showing example components of a debris tracking system. In some implementations, the components are software components that are distributed across various hardware devices that shown in FIG. 1. In other implementations, some of the components may be implemented in hardware or firmware. The components are arranged as shown in FIG. 2 for purposes of illustration only; the components can be arranged in other ways without deviating from the spirit of this description.

In one example implementation, as shown in FIG. 2, various components can be included in a field monitor module 201, which can correspond to an input device at the debris site 101 (e.g., the input device 123). Other components can be included in a disposal monitor module 204, which can correspond to an input device at the disposal site 104 (e.g., the input device 127). Still other components can be included in an event manager module 207, which can be executed by the event manager device 117. Each of these example modules is described in more detail below. Also described is a certification manager module 210, which can be included in the input device 123, the event manager device 117 or in another stand-alone device (not shown in FIG. 1).

In some implementations, the field monitor module 201 provides various functions to personnel at a debris site (e.g., "field supervisors") who are responsible for overseeing the processing of individual debris items or loads of debris items. One primary function of field supervisors at the debris site (e.g., debris site 101) may be to manage removal or processing of particular kinds of debris—in particular, by generating load tickets (or alternatively, processing tickets) and issuing the tickets to specific haulers or processors to authorize and track the removal or processing of specific debris items. The tickets can be important in facilitating payment to specific haulers or processors for work performed and in facilitating auditing of a debris clean-up process.

Different tickets can authorize the removal or processing of different kinds of debris. For example, in the context of a clean-up operation following a tornado or hurricane, individual load tickets can be created for specific types of debris such as downed trees and other displaced vegetative matter that is on the ground, "white goods" (i.e., appliances such as refrigerators, freezers, ranges, dishwashers, washers, dryers, etc.), and so on. As another example, individual processing tickets can be created for processing debris items at the initial location. For example, a processing ticket could be created to cut down a "hanger" (i.e., a limb that is only partially attached to a tree in a manner that poses a danger to pedestrians, vehicles or structures below) or a "leaner" (i.e., a trees that is leaning in a manner that poses a danger to nearby people, vehicles and structures), or to grind a stump below ground level.

In some implementations, the load tickets or processing tickets are created by a ticket manager 213. As indicated above, the tickets themselves can be electronic records that store various information, such as debris type, debris location and optionally other information such as the quantity or size of the debris item(s) (e.g., a tree having a 24" stump, 7 cubic yards of vegetative material, etc.), a time stamp, information about the field personnel responsible for creating the ticket, etc. In some implementations, the electronic tickets are ultimately stored on a portable electronic storage device carried by the particular debris processor or hauler that is assigned to that ticket. For example, the portable electronic storage device can be a smart card or an RFID (radio frequency identification) tag. To transfer tickets generated by the ticket manager 213, the field monitor module 201 can include a ticket device interface 216 (e.g., an interface for writing information to the smart card, RFID tag or other portable electronic storage device that is used to store ticket information).

To store location information in each electronic load or processing ticket, the field monitor module 201 can include a GPS module 219 that interfaces with GPS hardware on the data input device (e.g., data input device 123) on which the field monitor module 201 resides. The GPS module 219 can obtain location coordinates corresponding to a current location of the data input device when the ticket is generated. Thus, if the field supervisor responsible for creating an electronic ticket is near a debris item corresponding the electronic ticket, the electronic ticket may reflect a relatively precise initial location for that debris item.

In some implementations, operation of the field monitor module 201 may be access-controlled. That is, only authorized field personnel may be able to employ the ticket manager 213 to generate load tickets. To control access, the field monitor module 201 can include a security module 222 that blocks access to the various functions until an authorized employee has provided login information or has been otherwise authenticated. In some implementations, an authentication process can include reading a smart card or RFID-based employee badge that may be issued to authorized field supervisors. In such implementations, the security module 222 can interface with any hardware resources or the corresponding input device to authenticate a field supervisor (e.g., a smart card or RFID reader).

Figure 3A:
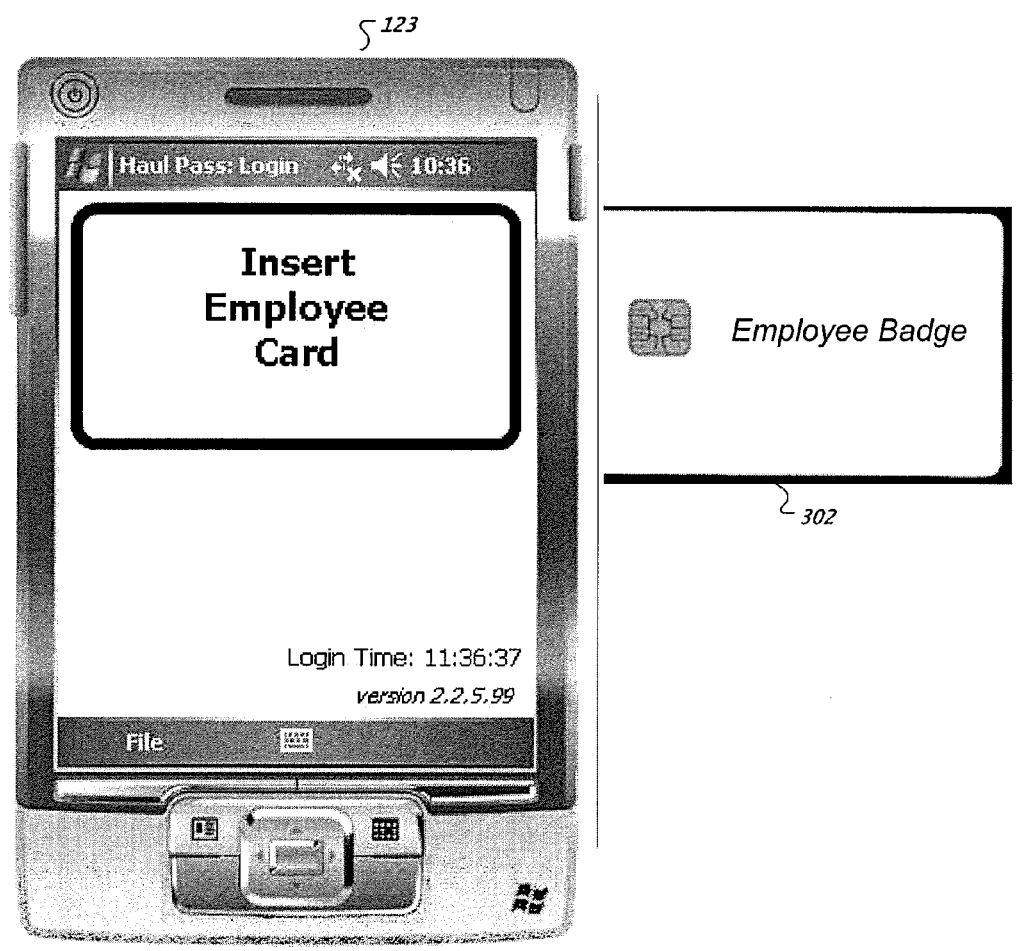
FIGS. 3A-3B depict the creation of an example electronic load ticket.
Figure 3B:
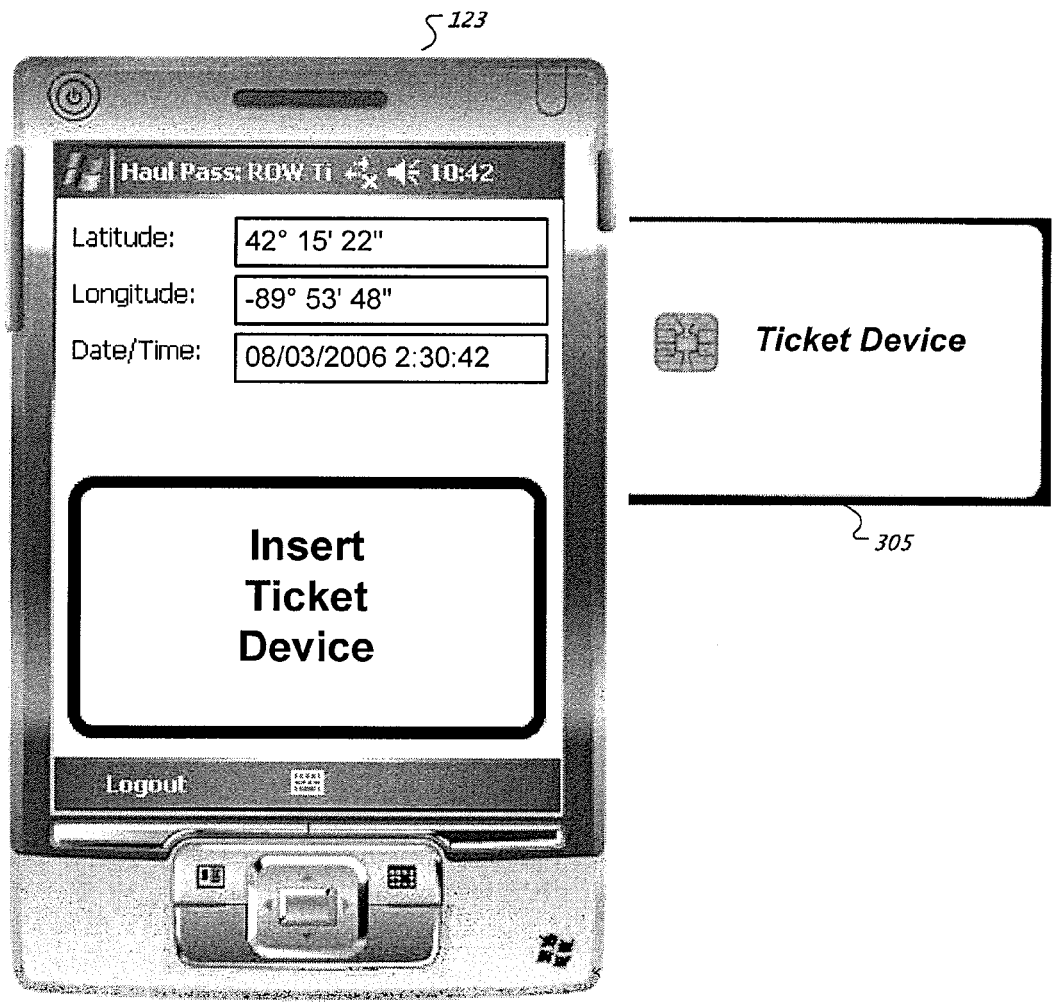

FIGS. 3A and 3B depict one example process by which a field supervisor can create an electronic ticket. As depicted by FIG. 3A, the process of making an electronic load ticket can be initiated by the field supervisor entering login or authentication information (e.g., by presenting a smart card-based employee badge 302 to a smart card reader included in the input device 123). In some implementations, a field supervisor need only enter login or authentication information once during the day in order to access the ticket manager 213. In other implementations, (e.g., as an added security measure), the field supervisor may authenticate himself or herself each time an electronic load ticket is made. In some implementations, successful authentication of a field supervisor can result in an employee identifier being displayed on the input device 123. In addition, the employee identifier may be added to any electronic ticket that is subsequently generated.

FIG. 3B illustrates example load ticket information that may be generated by the ticket manager 213 and subsequently stored on a ticket device 305 (e.g., the portable electronic storage, such as a smart card) when the ticket device 305 is presented to a corresponding reader on the input device 123. As shown in one implementation, the load ticket information can include a location (e.g., specified in latitude and longitude coordinates) and a time stamp. The load ticket information can also include a debris type (not shown). In particular, another input field (e.g., a drop down box) can be provided to enable the field supervisor to select a debris type. In some implementations, specific field supervisors are assigned to specific debris types, and the ticket manager 213 automatically includes debris type information in the ticket based on the field supervisor's identifier. For example, one field supervisor may be assigned to generating tickets for leaners, and any time that field supervisor employs the input device 123 to generate a ticket (as evidenced by login or authentication information), the ticket manager 213 can automatically set a debris type or classification field to leaners. Another field supervisor may be assigned to generating load tickets for whitegoods, and any time that field supervisor employs the input device 123 to generate a load ticket, the ticket manager 213 can automatically set a debris type or classification field to whitegoods.

Returning to FIG. 2, the field monitor module 201 can include modules that provide additional functionality. In particular, the field monitor module 201 can include a road manager component 225 that can be employed by a field supervisor to manage clean-up on, for example, a street-segment by street-segment basis. The road manager component 225 can be used record and report the volume of debris to be collected and to keep track of how many passes have taken place on that street segment. In the initial phases of the debris management effort, the road manager component 225 can be used by mobile crews to assess the amount of debris to be moved from each street segment. The volume can be recorded as an incremental cumulative volume by a series of piles along the street, or recorded as a single volume for the whole street segment. In particular, field supervisors can record a location associated with various debris items that are identified in an initial assessment using the GPS module 219, enter an estimated volume, and even take a picture of the debris if the corresponding input device is equipped with a camera. As the clean-up progresses, the field supervisors can employ the road manager component 225 to record and report the status of the effort (e.g., by tagging each street segment with an appropriate pass number (first, second, third pass, etc.) and/or percent complete).

To streamline human resource issues related to tracking field supervisors' time spent on eligible debris clean-up activities and to reduce the possibility for fraud, the field monitor module 201 can include a timesheet tracking component 228. The timesheet tracking component 228 can, for example, record a time at which a field supervisor is authenticated by the security module 222. Moreover, using the GPS module 219 the timesheet tracking component 228 can record a current location of the device when the field supervisor signs in. To further track field supervisors' work, each field supervisor may be required to sign out at the end of a day, or during lunches or other non-working periods. The timesheet tracking component 228, in conjunction with the GPS module 219 can also periodically store a time stamp and a current location in order to create an audit trail for later use, to facilitate automatic generation of timesheets, or to facilitate oversight of the field supervisor by a manager. Data captured by the timesheet tracking component 228 can be regularly transferred to other devices or systems (e.g., the event manager device 117) for these various purposes.

The load monitor module 201 can also include a data communication and synchronization component 229. In some scenarios, such as scenarios in which a communication infrastructure is available, the communication/synchronization component 229 can be used to communicate information that is collected by other components in the load monitor module 201 (e.g., timesheet tracking information, current location information about various employees, road manager information, or information about generated load tickets) to the event manager device 117. In other scenarios, such as scenarios in which a communication infrastructure is not always available, the communication/synchronization component 229 can store information received by other components, and upload the information to the event manager device 117, or synchronize the information with other information stored by the event manager device 117. In particular, for example, in order to facilitate the most up-to-date exchange of information possible within an overall system, the communication/synchronization component 229 can be a low-level component that tracks information stored by components of the load monitor module 201 and can upload that tracked information periodically, or as soon as a communication interface of some kind is available or becomes available. More particularly, the communication/synchronization component 229 can be configured to attempt connections to multiple different communication networks (e.g., cellular networks of multiple different service providers, satellite networks, shortwave networks, other two-way communication networks, etc.) and employ whatever connection is available to transfer data.

The disposal monitor module 204 can provide various functions for personnel at a disposal site (e.g., "disposal supervisors"), such as the disposal site 104. In some scenarios, a primary function of a disposal supervisor is to confirm that the debris removal assignments captured by electronic load tickets have been actually carried out. In particular, the disposal monitor module 204 can include a confirmation manager component 232 that reads, in conjunction with a ticket device interface 235, an electronic load ticket (e.g., from a hauler's portable electronic storage device) and enables a disposal supervisor to confirm that the hauler is disposing of debris that matches the electronic load tickets. A process by which assignments represented by load tickets can be confirmed is now described in some detail below and also with reference to a specific implementation depicted in FIG. 7.

Figure 4A:
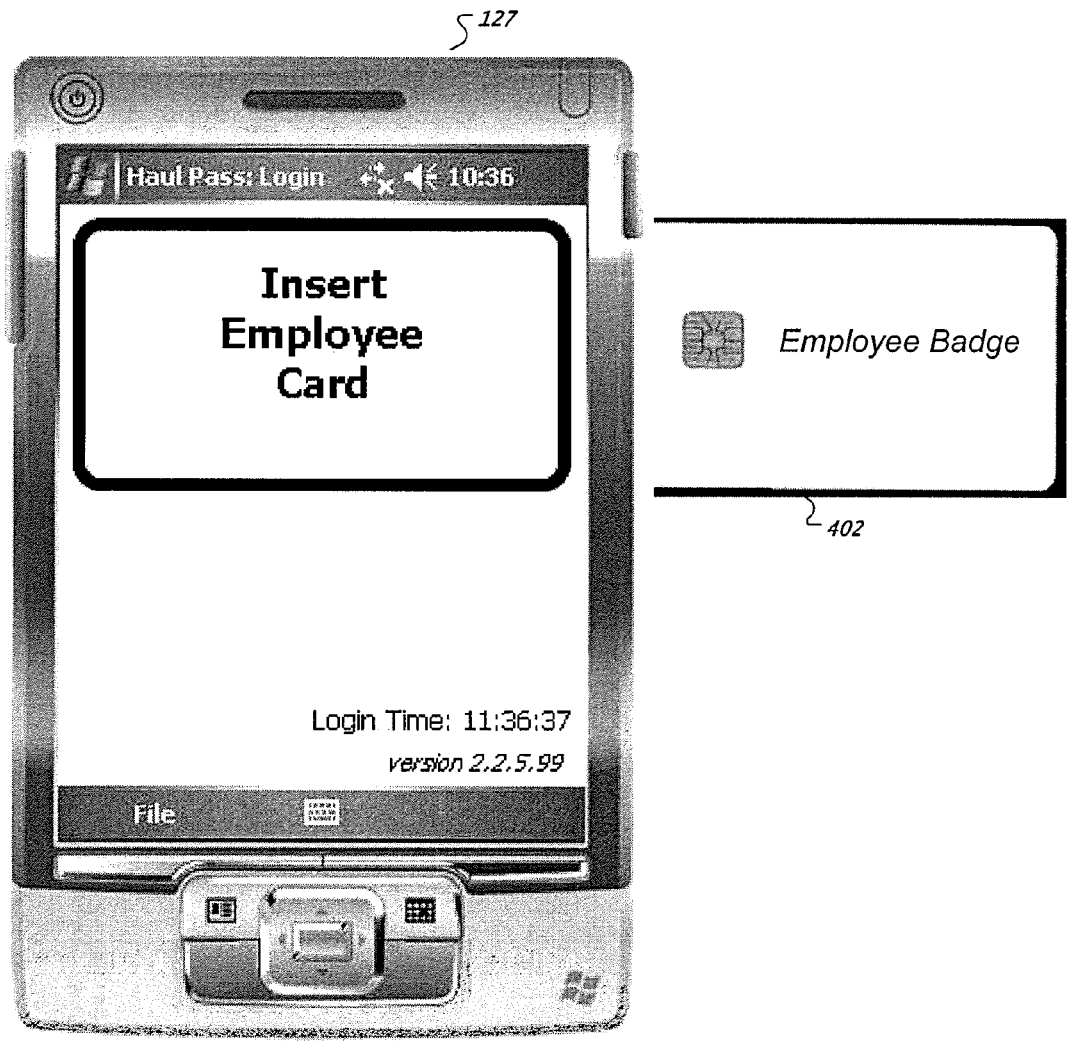
FIGS. 4A-4D depict the closing of an electronic load ticket.

A hauler can arrive with a load of debris at the disposal site 104 and can give a disposal supervisor at the disposal site 104 his or her portable electronic device (e.g., "ticket device") onto which a corresponding electronic load ticket has been previously stored. The disposal supervisor can use the input device 127 to read the ticket device (for example, by employing the confirmation manager 232 and ticket device interface 235). Prior to accessing information on the ticket device, the disposal supervisor may have to authenticate his or her identity to the input device 127 in a manner depicted in FIG. 4A, which can be similar to the process illustrated in and described with reference to FIG. 3A (i.e., one example authentication process can include confirming identification information stored on a smart card or RFID employee badge 402 that is presented to the input device 127). This authentication process can employ a security module 238 that may run on the input device 127.

Figure 4B:
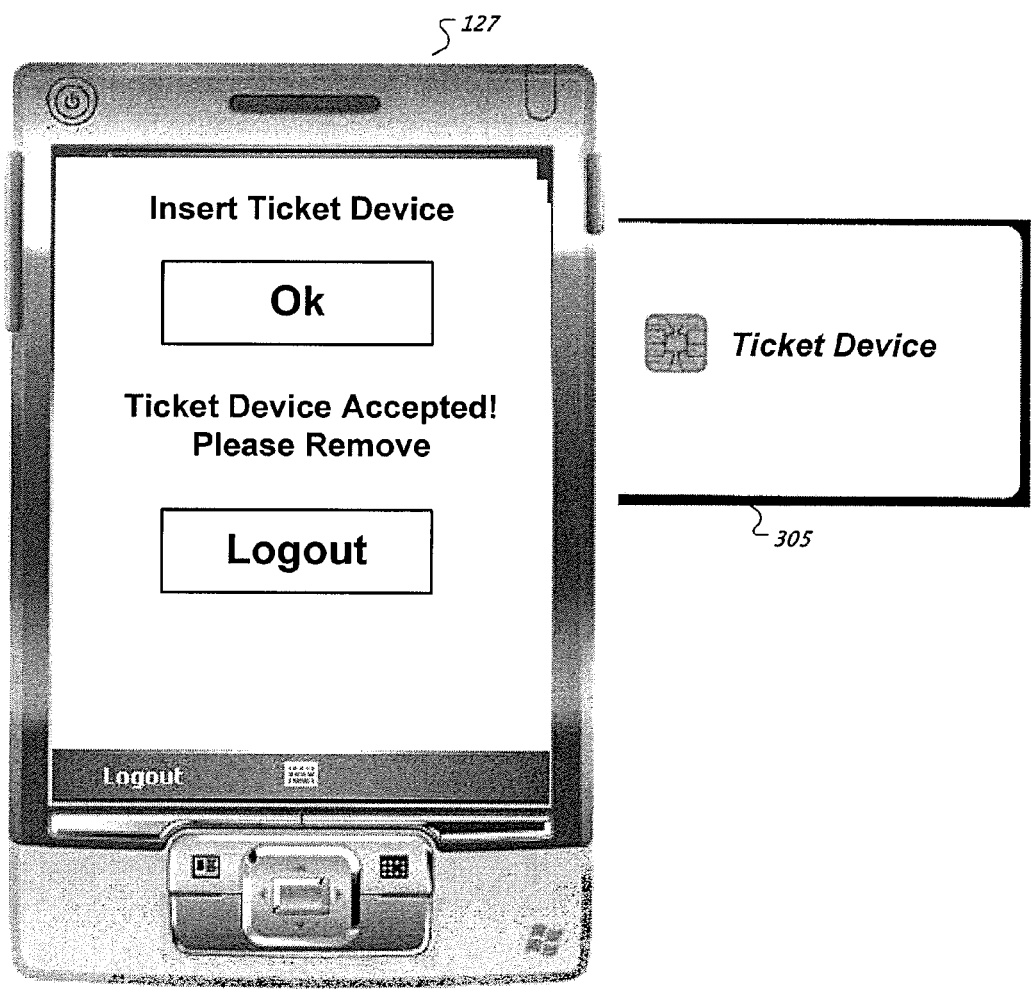

Once authenticated (if authentication is necessary), the disposal supervisor can use the functions of the disposal monitor module 204 to read the ticket device 305. In particular, the disposal supervisor can read identification information associated with the hauler, which may have been previously stored on the portable electronic device during a certification process (described below in more detail). FIG. 4B depicts the input device 127 reading the ticket device 305 (e.g., the portable electronic device carried by a specific hauler and associated with the hauler's transporter, onto which load ticket information has been previously stored).

Figure 4C:
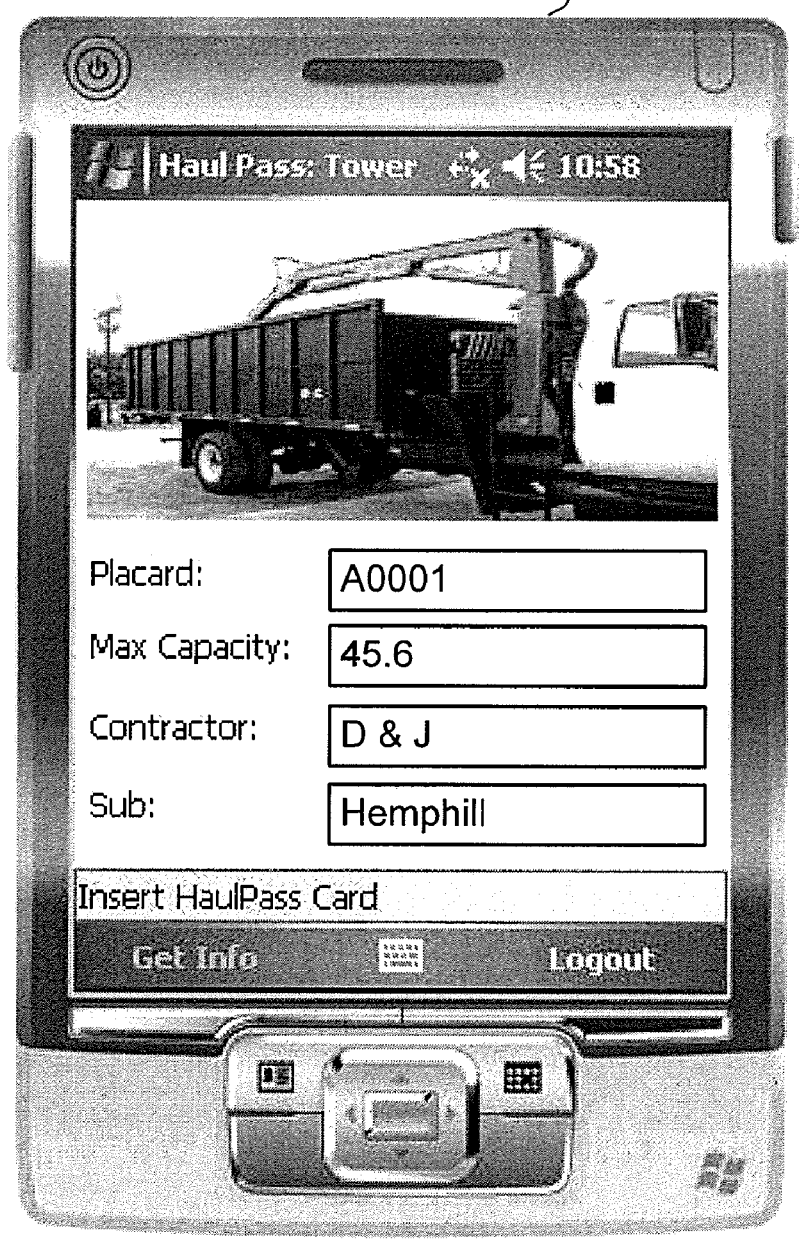

As depicted in FIG. 4C, the identification information can include a placard number, which in some implementations can correspond to a physical placard (e.g., a plastic or paper sign or board displayed in the windshield of the hauler's transporter, a sticker on the windshield, a number painted on the side of the transporter, etc.). The identification information can also include other information, such as the subcontractor or contractor with which the hauler is associated, the capacity of the transporter, and a picture of the transporter. This information can all be used by the disposal supervisor to confirm the identity of the hauler before the hauler's load ticket is closed out. By facilitating quick confirmation of the hauler and the hauler's transporter, the certification information can help reduce fraud in the system.

Figure 4D:
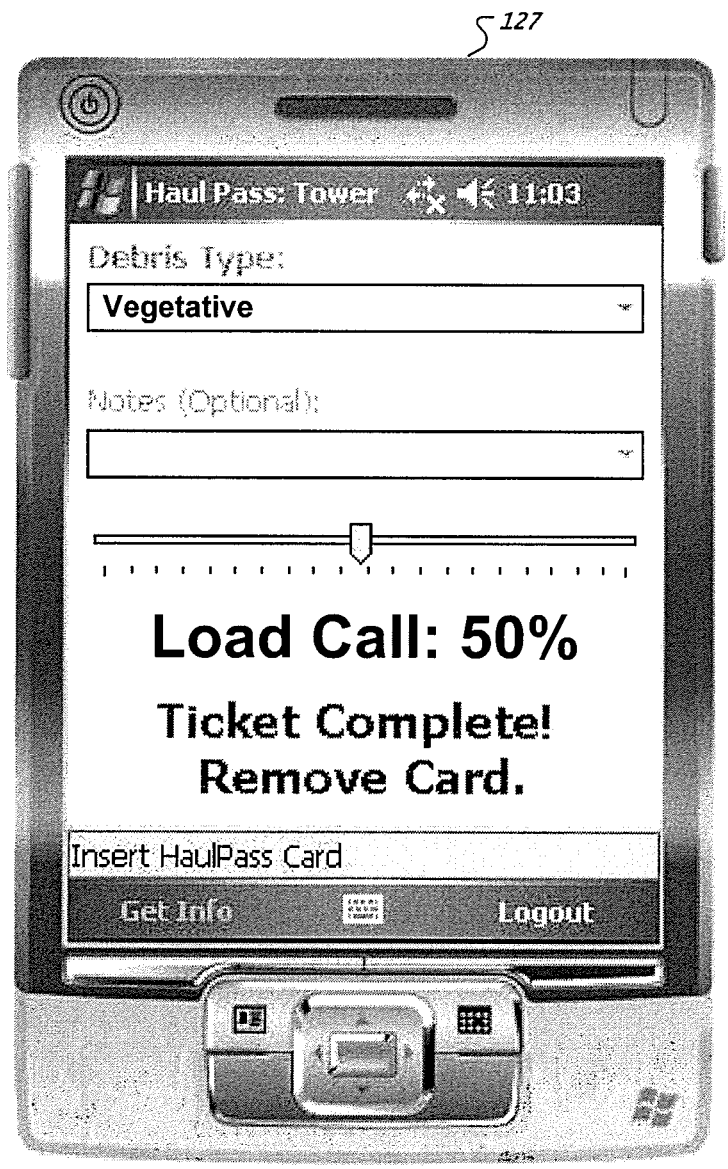

Reading the portable electronic device can also cause the load ticket information to be retrieved, as depicted in FIG. 4D. In particular, the ticket device interface 235 (e.g., a smart card or RFID interface, similar to the ticket device interface 216 in a corresponding load module 201), can access the ticket device 305 to retrieve load ticket information stored therein. In some implementations, retrieval of the load ticket by the input device 127 causes the electronic load ticket to be deleted from the portable electronic device. In some implementations, the disposal supervisor can confirm certain information, which may already be populated (e.g., debris type), and the disposal supervisor may enter other information, which may not be initially populated (e.g., a percentage full).

Once all necessary information has entered, the load ticket can be closed out. That is, the ticket can be marked as complete electronically, and sent to the event manager device 117. In particular, referring back to FIG. 2, the disposal monitor module 204 can employ a data communication/synchronization module 241 to transmit a completed removal or processing ticket to the event manager device.

As shown in FIG. 2, the disposal monitor module 204 can also include a timesheet tracking module 244—similar to the timesheet tracking module 228. In some implementations, the disposal monitor module 204 can also include a GPS module (not shown) for tracking position of disposal supervisors (e.g., for auditing purposes, as described with reference to the load monitor module).

Various central processing functions can be performed by the event manager module 207. In particular, as depicted in FIG. 2, the event manager module can include efficiency/planning tools 251, user interface components 254 and administrative tools 257, each of which is now briefly described.

Efficiency/planning tools 251 can include various spatial analysis tools for managing an overall debris clean-up effort with optional reference to geospatial information. A few examples are mentioned and described. In particular, the efficiency/planning tools 251 can include a spatial field monitor assignment tool for comparing load and disposal supervisor home addresses with assignment locations to minimize travel and speed deployment time. A volume estimation completion tool can be included to summarize initial volume estimates captured from, for example, the road manager component 225, and to analyze and display those estimates on a map interface. This tool could be used to initially estimate the number of contractor trips required to clear effected roads. A spatial TDSRS placement tool can be included to analyze the distribution of estimated debris volumes compared to potential TDSRS sites (e.g., disposal sites) to, for example, determine the optimal placement of TDSRS sites. A debris pickup/sorting allocation and assignment tool can be included to assign debris pickup routes (e.g., to allocate and assign debris pickup locations (by street segment) to the closest TDSRS). This tool can use a combination of shortest path (as the crow files) and street network paths to determine shortest or optimal paths between the debris pickup sites and an appropriate TDSRS. A field data collection and compilation tool can be included to streamline and automate the process of gathering data from input devices at the debris and disposal sites or other devices used for certification functions (described below in greater detail). A web-based project status mapping tool can be included to provide an interactive web-based map interface to allow project stakeholders and the general public to keep track of the current status and progress of the clean-up effort. Thematic displays of initial debris volume; streets by pass status/percent cleaned, TDSRS by volume throughput, etc., can be provided by the tool. Various other reporting and analysis tools can be included. In particular, other reporting and analysis tools can provide users with a series of default reporting options (e.g., export-to-Excel), and limited ad-hoc reporting capabilities to customize report contents and formats. The various tools may generate tabular reports with information such as total volume of debris hauled to date, debris hauled by contractor, debris quantity at the reduction site, etc. Comparison reports can be generated that look at clean-up performance over user defined time windows by hauler, by TDSRS, etc.

The event manager module can also include various user interface tools 254. The user interface tools 254 can generally include components for formatting and displaying information in a particular format or on a particular device. In particular, for example, a hard-copy map generation tool can provide a series of map templates for printing event-wide status maps as well as detailed street maps surrounding various TDSRS or disposal sites. Hard copy maps can be given to the load or disposal supervisors to distribute to debris haulers, e.g., for use in navigating between debris and disposal sites. The user interface tools 254 can also include various components for interfacing with the GIS system 130 and displaying combined GIS and debris-related information to various other devices, such as the terminals 137, 141 or 145.

The event manager module can also include various administrative interface tools 257. The administrative tools can include, for example, tools for performing reverse geocoding. Depending on specific reporting requirements, GPS coordinates may need to be converted to street intersections or to specific addresses; a reverse geocoding tool could provide this conversion service. A timesheets and payroll tool can collect daily timesheet entries (e.g., recorded by the timesheet tracking components 228 and 244). Moreover, a timesheets and payroll tool can analyze and compile time records for employees and perform various auditing functions, such as evaluating and reporting on gaps in work activities relative to start and end times.

A billing and invoice generation tool can also be included for compiling time and material costs and generating automated invoices to be delivered to various stakeholders of a clean-up operation. In addition, the billing and invoice generation tool can analyze various load tickets and disposal confirmations and automatically generate invoices on behalf of particular haulers (e.g., based on information in the system regarding type of material hauled, amount hauled, and agreed-upon rate for hauling the material). In some implementations, the agreed-upon rate can depend on a distance hauled, which the billing and invoice generation tool may determine from geographical information corresponding to, for example, specific load tickets and disposal confirmations, or from other geospatial information in the system. More particularly, haulers may receive a higher rate per cubic yard of "long-haul" material (e.g., material that must be driven a relatively long distance) than for each cubic yard of "short haul" material (e.g., material that is only driven a short distance to an appropriate debris site). Moreover, the rate may depend on the type of material hauled (e.g., vegetative matter may have one base rate; white goods may have another base rate). The billing and invoice generation tool can determine an appropriate distance for specific tickets, apply an appropriate rate corresponding to the determined distance and type, and generate a bill or invoice.

A data consolidation and synchronization tool can be included for receiving information from various remote devices (e.g., the data communication/synchronization modules 229 and 241). In some implementations, the data consolidation and synchronization tool can include the low-level interfaces for physically receiving data from the remote devices, and it can also include data formatting and conversion tools for converting the received data into an appropriate format for use in the event manager module 207.

An employee tracking tool can also be included in the administrative tools 257. In some implementations, this tool can identify employees who are currently in the field, or in a particular general location, or identify a "current" location for a particular employee. The employee tracking tool can, in some implementations, receive location/timestamp information from each remote device corresponding to a particular employee (e.g., from timesheet tracking modules 228 or 244, via the data communication/synchronization modules 229 and 244, via the data consolidation and synchronization tool mentioned above) and provide most-recently available current location information when requested.

As mentioned above, a certification manager module 210 can be another stand-alone module, as shown, or the certification manager module 210 can be included in the event manager module 207, the load manager module 201, or somewhere else. In some implementations, the certification manager module provides three primary functions: registering vehicles (e.g., with a vehicle certification component 260), registering employees (e.g., with an employee certification component 263), and registering and certifying sites (e.g., with a site certification and registration component 265).

Figure 5A:
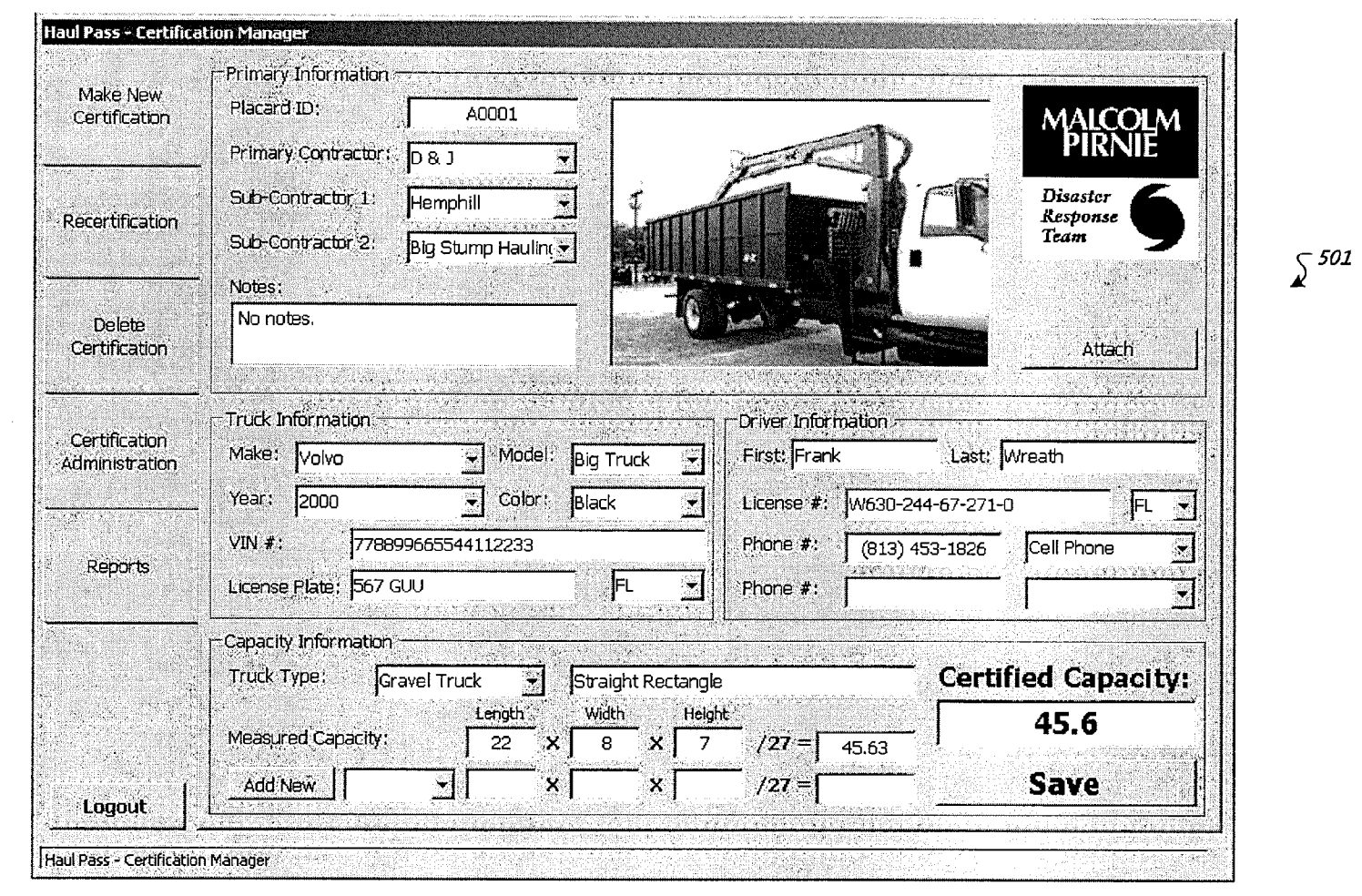

The vehicle certification component 260 can allow appropriate administrative personnel to enter various information about a transporter that is authorized to be used in a debris clean-up operation. An example user interface 501 for certifying vehicles is shown in FIG. 5A. As shown, the example user interface 501 can include various tabs for performing certification operations—such as tabs for certifying a vehicle, recertifying a vehicle, deleting a certification, administering certifications (e.g., editing data associated with certifications), or running reports.

In some implementations, each certification record can include a placard identifier, which can correspond to a physical placard that may be issued to a hauler during the certification process, or the placard identifier can reference existing markings on the transporter. In some scenarios, the physical placard is affixed to a side or window of the vehicle and can be evidence at both debris and disposal sites that the vehicle is registered, certified and authorized to be employed in the debris clean-up operation.

Each certification record can also include subcontractor and contractor information, driver information (e.g., name, license, contact information), additional information about the transporter (e.g., make, model, model year, vehicle identification number, license plate, license plate state, type of transporter, hauling configuration and capacity, and an overall certified capacity). An overall certified capacity of a transporter can be used by various devices in the system to track a total amount of debris hauled, as is described in greater detail below.

Once a vehicle certification record is completed, the record can be saved to a portable electronic storage device (e.g., a smartcard or RFID device, such as the ticket device 305 that is shown in FIGS. 3B and 4B) that can be carried by a driver of the vehicle and used to store load ticket information. The vehicle certification information can also be uploaded to the event manager device 117. In some implementations, the certification information is encrypted or otherwise secured to minimize the chance that it can be altered for fraudulent or unauthorized purposes.

The employee certification component 263 can allow appropriate administrative personnel to enter various information about an employee that is authorized to work in a debris clean-up operation. In some scenarios, each employee of each contractor or subcontractor that is hired to work in a debris clean-up operation may be required to be certified (e.g., for audit purposes).

Figure 5B:
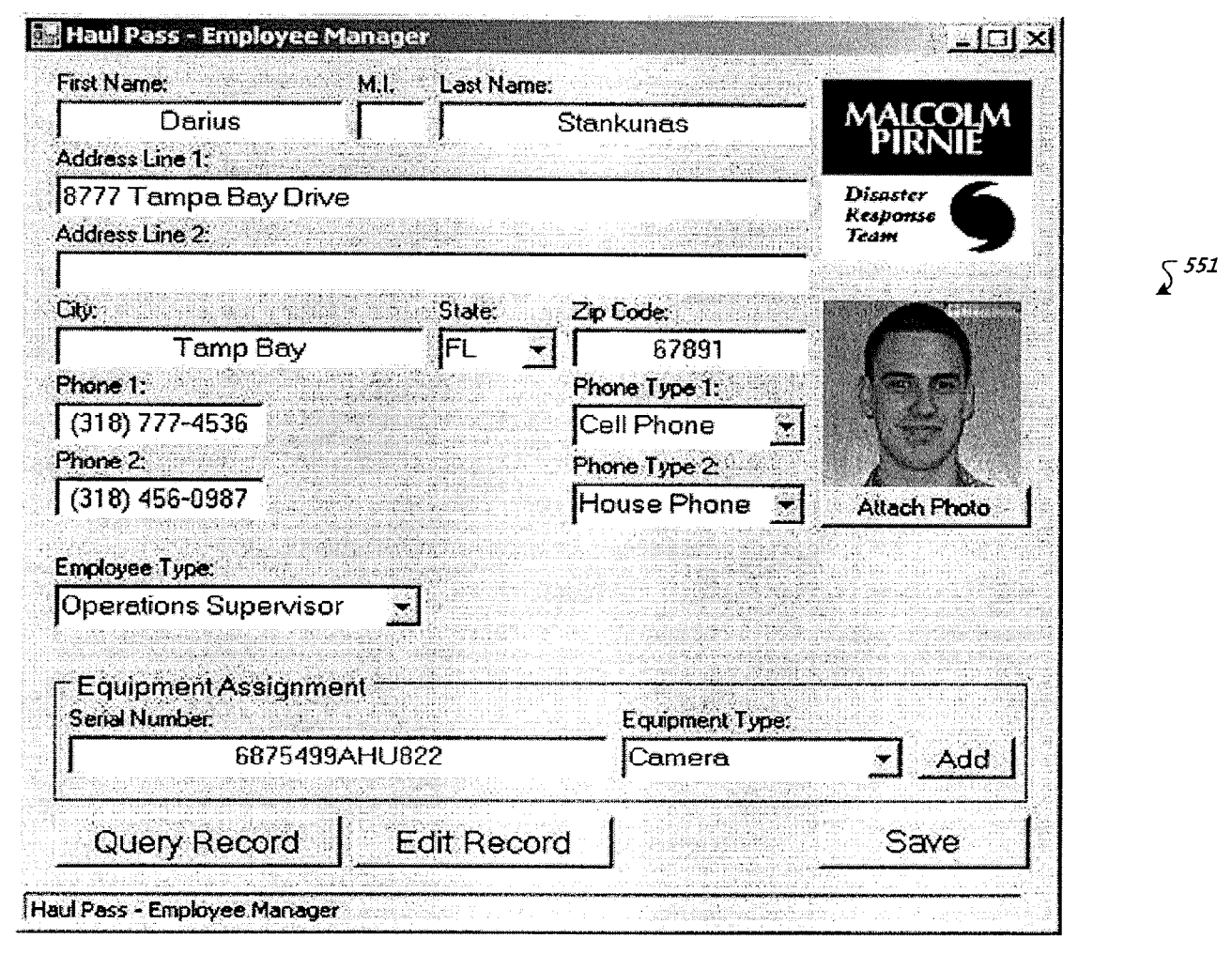

An example user interface 551 for certifying employees is shown in FIG. 5B. As shown, the user interface 551 can include tabs or controls for querying, editing or saving records, and each record can include various information, such as name, address, contact information, title, and any equipment (e.g., a device used in the clean-up operation, such as a camera, or a transporter) that may be assigned to the employee.

Figure 5C:
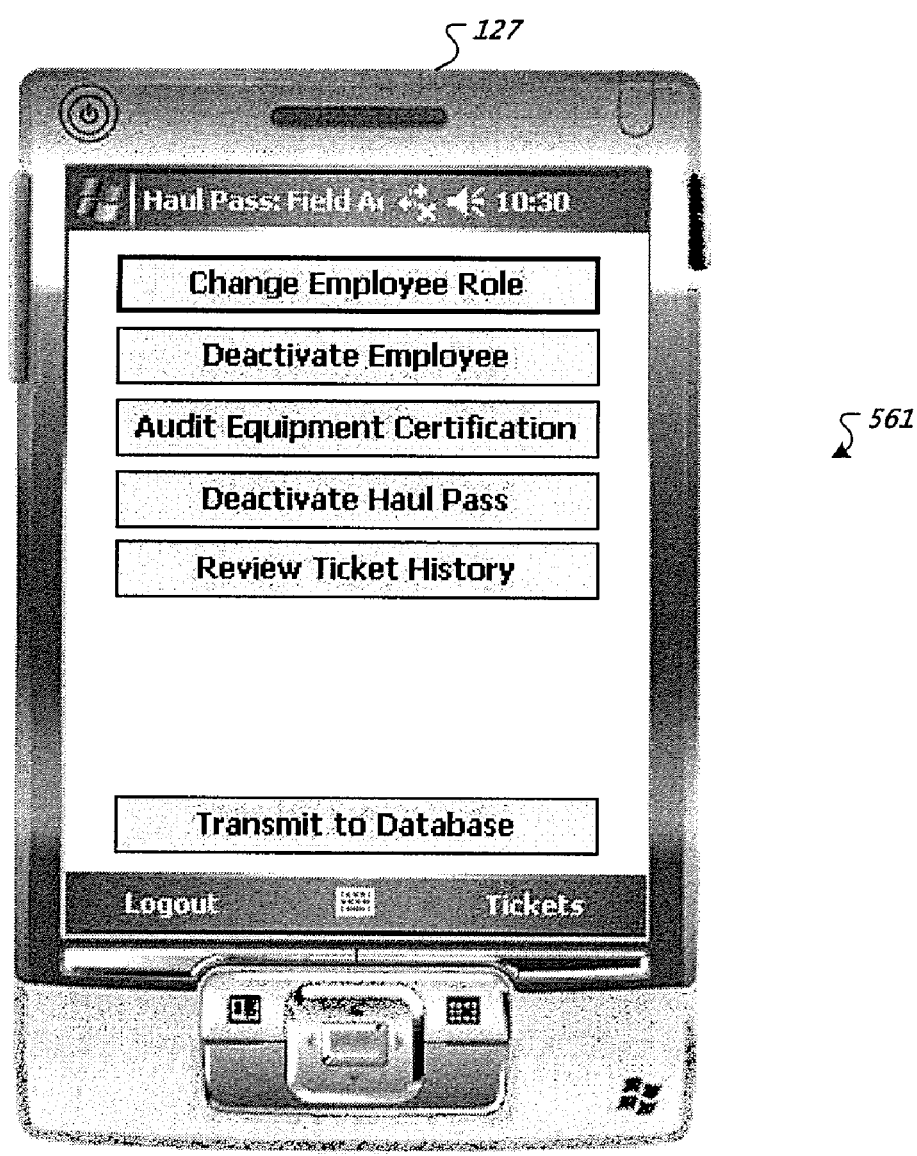
FIGS. 5C-5G illustrate example interfaces for administering employees, equipment and tickets.
Figure 5D:
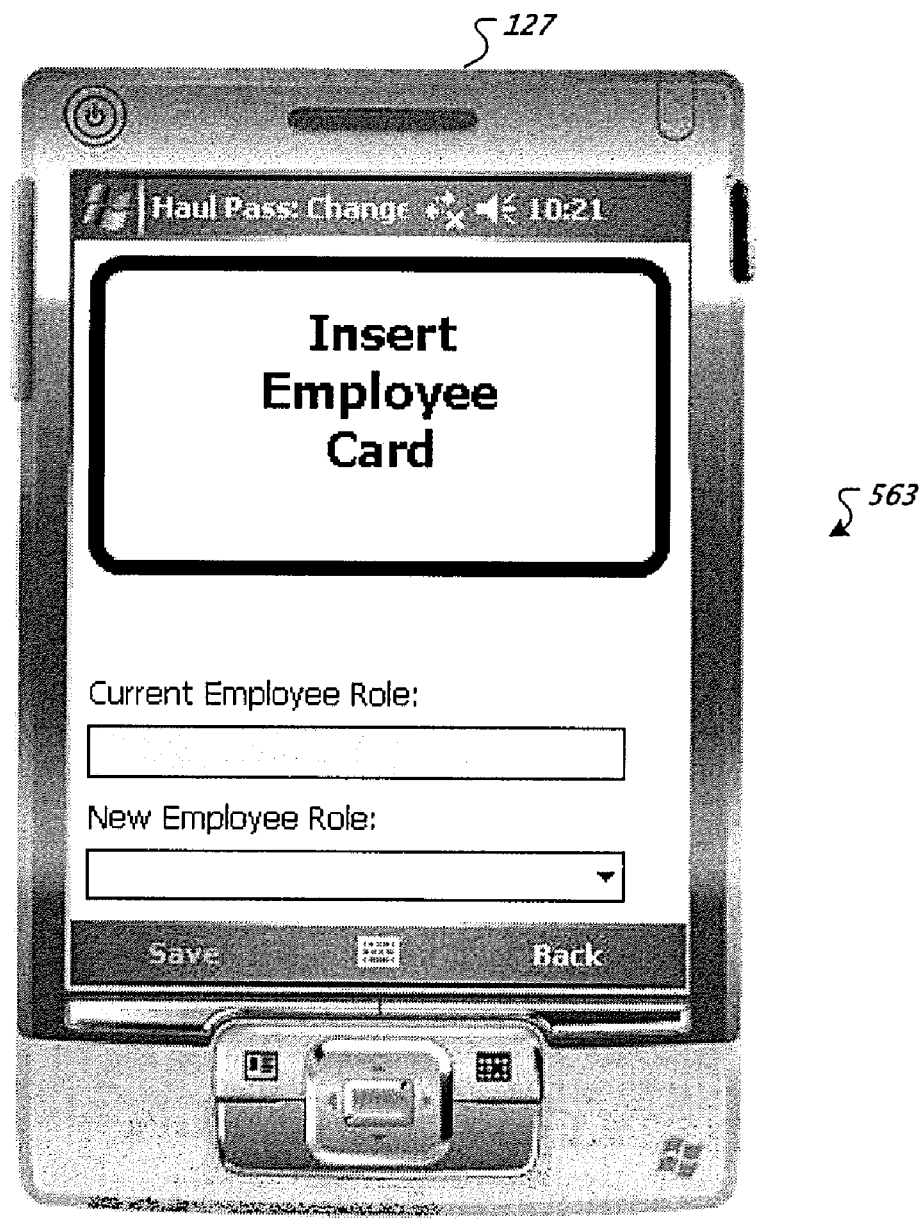
Figure 5E:
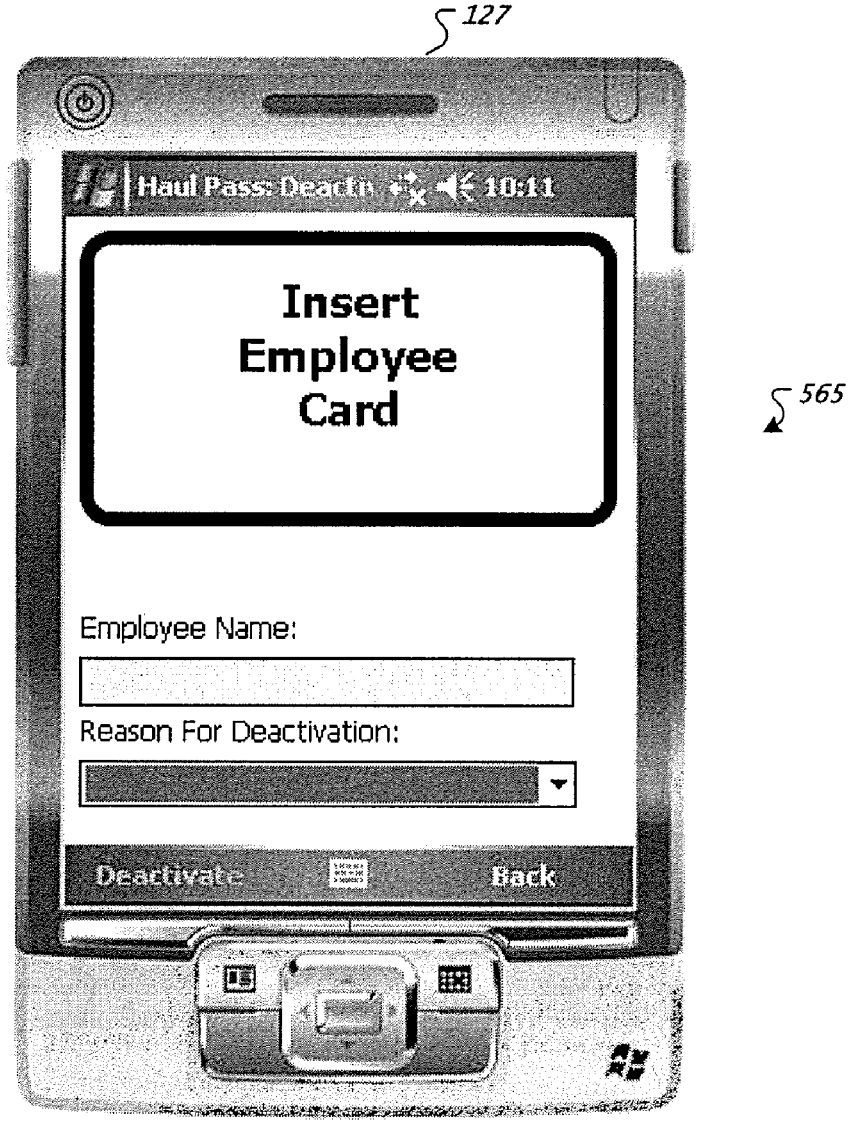
Figure 5F:
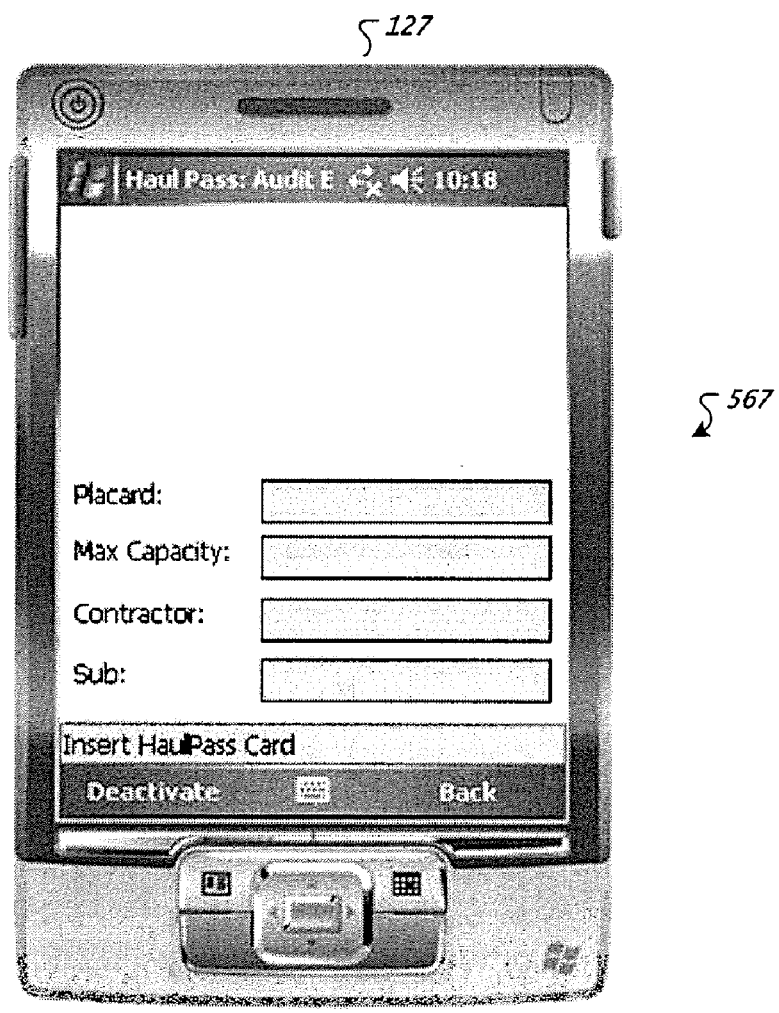
Figure 5G:
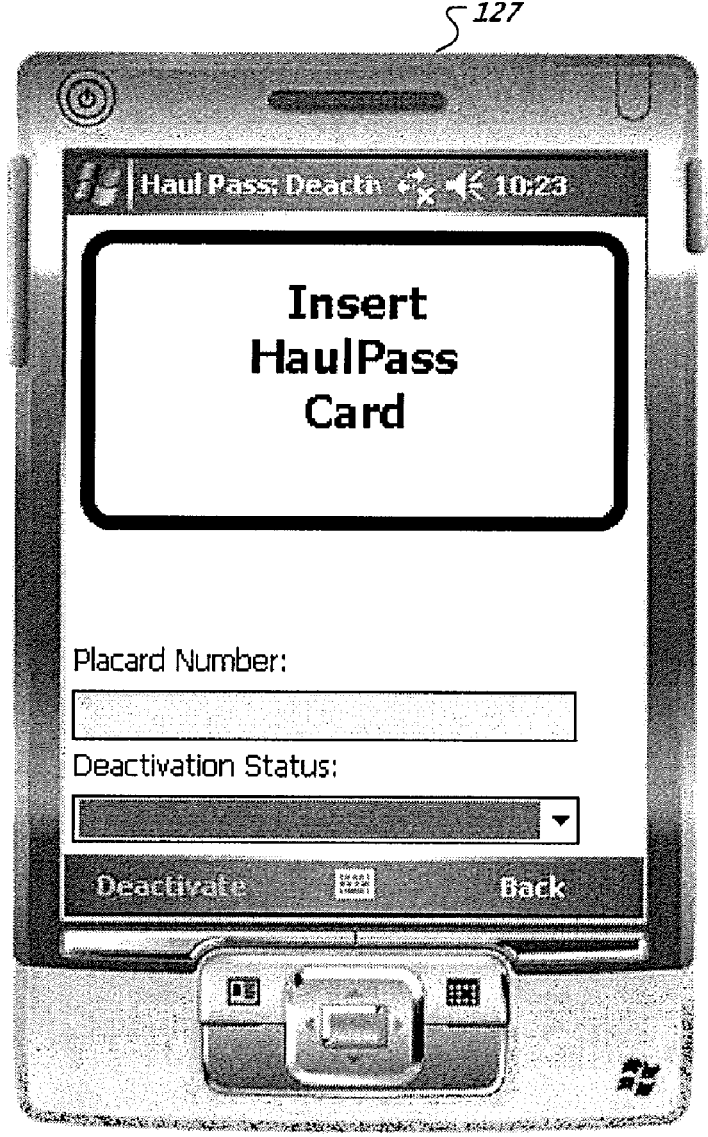

Additional interfaces can be provided for editing employee records, editing equipment records, or performing other administrative functions in the field. FIG. 5C depicts a menu 561 of example functions for editing various records; additional details regarding some of the depicted functions are provided with respect to FIGS. 5D-5G. In particular, FIG. 5D illustrates an example interface 563 that can be used for changing an employee role. As depicted, an employee card or badge (e.g., the badge 302 or 402 shown in FIGS. 3A and 4A, respectively) can be inserted into or placed in proximity of a corresponding reader (e.g., a smart card reader or RFID reader) and information associated with the employee (e.g., such as information originally entered through an interface, such as the interface 551, shown in FIG. 5B) can be changed. As one example, fields are shown for changing an employee role (e.g., from a field supervisor to a disposal or tower supervisor, from a ROW field supervisor to a ROE field supervisor, etc.). FIG. 5E illustrates an example interface 565 that can be used to deactivate an employee (and the employee's badge or card). FIG. 5F illustrates an example interface 567 that can be used to update information associated with a vehicle certification (and in particular, information associated with a vehicle certification that is stored on a portable electronic device, such as a HaulPass™). FIG. 5G illustrates an example interface 569 for deactivating a portable electronic device (e.g., a HaulPass™ device). In some implementations, deactivating inactive or invalid employee badges or portable electronic devices can be an important part of an overall security and fraud prevention scheme (e.g., to prevent unregistered transporters or employees from taking part in a clean-up operation).

The above-described interfaces are merely exemplary; various other field-auditing functions can be provided. In some implementations, access to the various functions is controlled and may require multiple login or authentication steps (e.g., an employee badge corresponding to an employee with field-editing authority may first be required, followed by additional login or authentication information (e.g, a separate password or badge)).

Various tools for certifying sites can be included in a site certification/registration module 265. The site certification/registration module 265 can be used to initially register debris sites (e.g., TDSRS sites). Registration can include entering location information for the debris site, assigning a name to the debris site, and optionally entering other information such as an estimated capacity of the debris site.

Figure 5H:
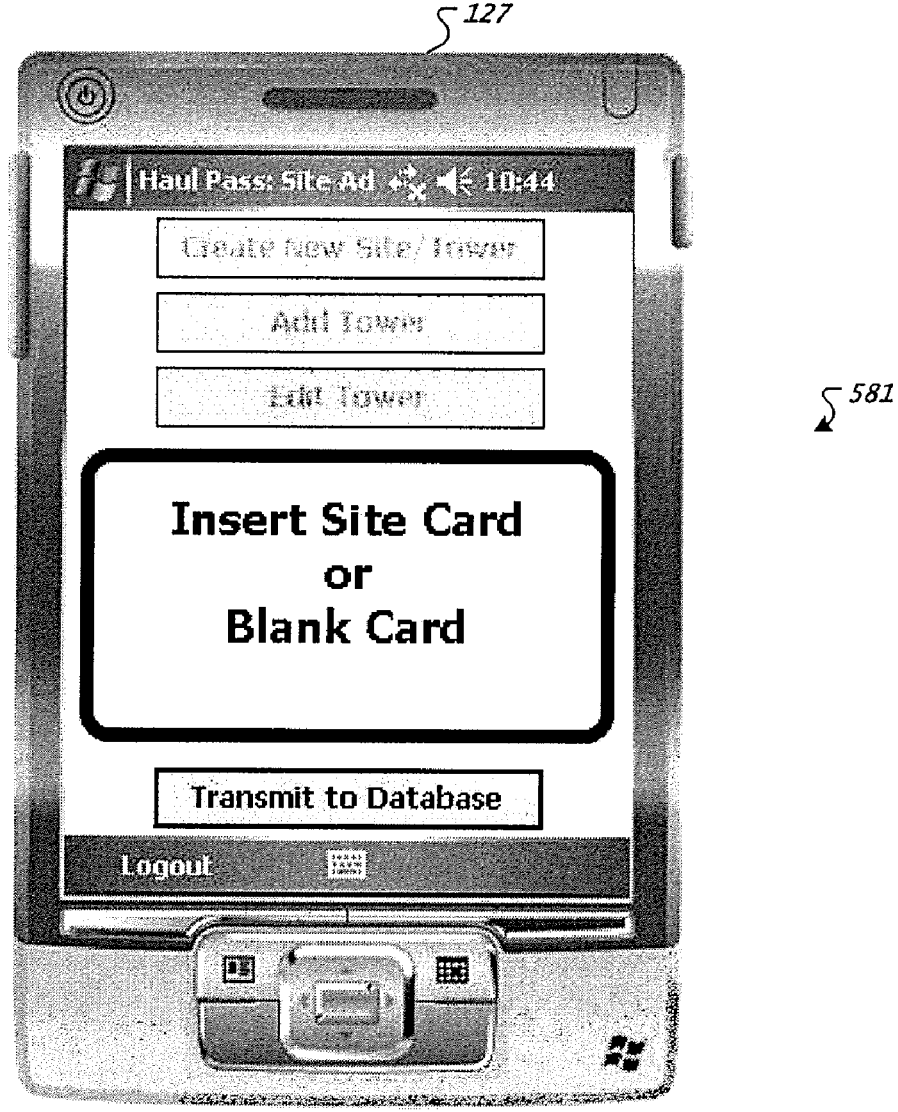
FIGS. 5H-5J illustrate example interfaces for administering sites.
Figure 5I:
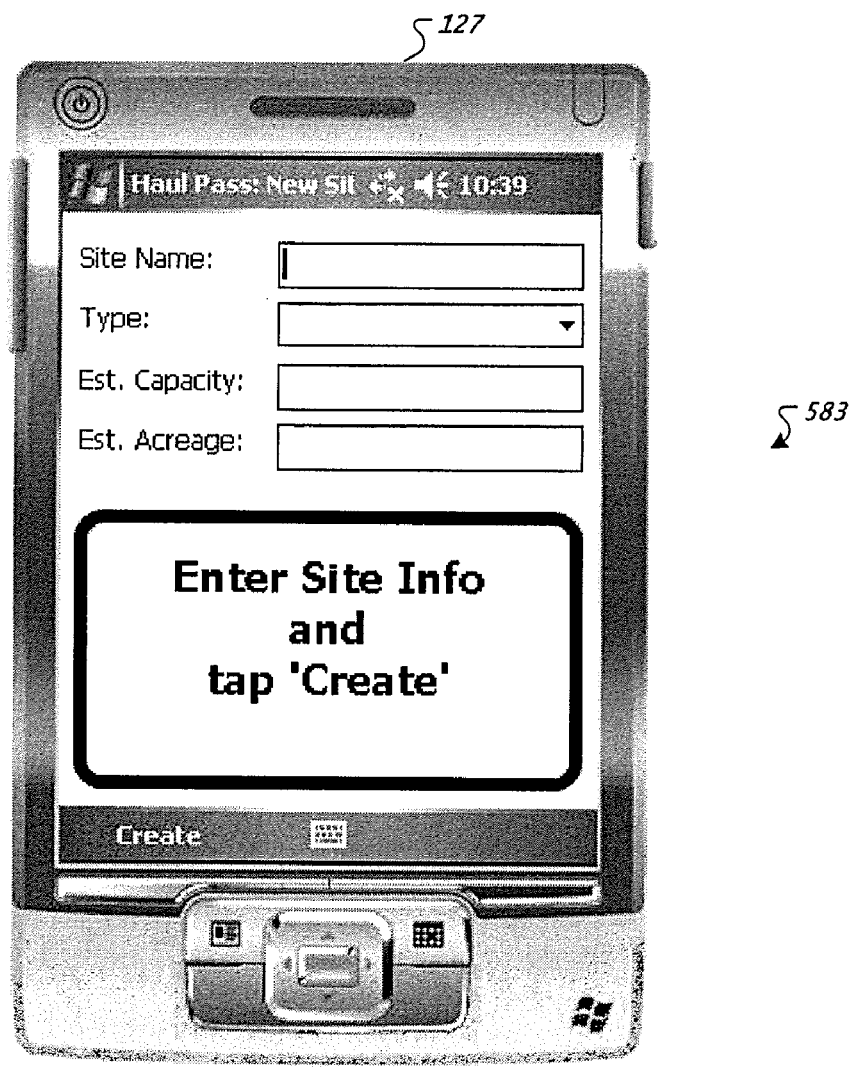
Figure 5J:
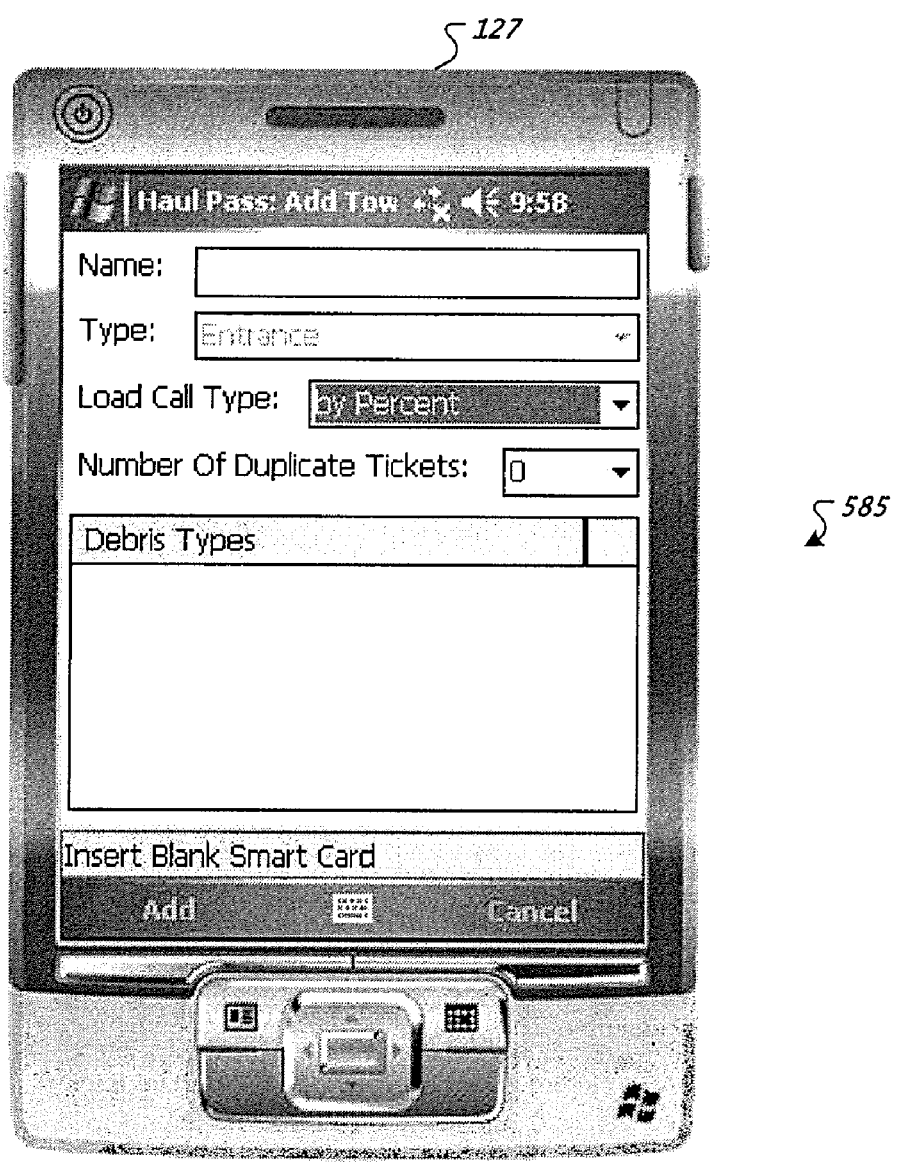

FIGS. 5H-5J illustrate various example user interfaces that can be used to provide various site certification functions. In particular, for example, FIG. 5H illustrates an example interface 581 for accessing various site-related functions. As depicted in FIG. 5H, the interface 581 can include access-control features, including for example, presentation of a special site card (e.g., a special employee badge, or an access-control card specific to administrative site operations) or input of site-based login information. In some implementations, once appropriate access-control information has been provided, various functions can be accessed, such as, for example, functions related to creating or adding a new site or tower, adding a tower or editing a tower.

FIG. 5I illustrates an example interface 583 through which new site information (e.g., information about disposal sites) can be entered. The new site information can include, for example, a name for the site (which may be useful in later referencing the site on maps and in various reports and tools); a type of site (e.g., type(s) of materials accepted at the site, such as vegetative matter, scrap metal, white goods, etc.); and information about the size of the site, including, for example, acreage and estimated capacity (e.g., in tons, cubic yards, days/weeks/months of operation relative to an average rate at which material will be disposed, etc.).

FIG. 5J illustrates an example interface 585 for entering information about a particular tower (e.g., a checkpoint associated with a particular disposal supervisor) at a disposal site. For example, a disposal site may have a number of different towers (e.g., one at each entrance to the site), and each tower may be configured differently. For example, one tower may be configured for receiving vegetative matter, while another tower may be configured for receiving white goods. As depicted in FIG. 5J, the example interface 585 can be configured to receive information including a tower name and location within the site (e.g., a particular entrance). In addition, the interface 585 can be used to configure a default manner in which disposal confirmations are generated at the tower. In particular, for example, capacity of transporters can entered as a percentage full (as depicted), or by some other measure (e.g., tons, pounds, cubic yards, per-item count or size, etc.). Other information can also be entered, such as information related to how may paper copies of tickets ("number of duplicate tickets") may be printed by a printer coupled to the corresponding input device.

Figure 6:
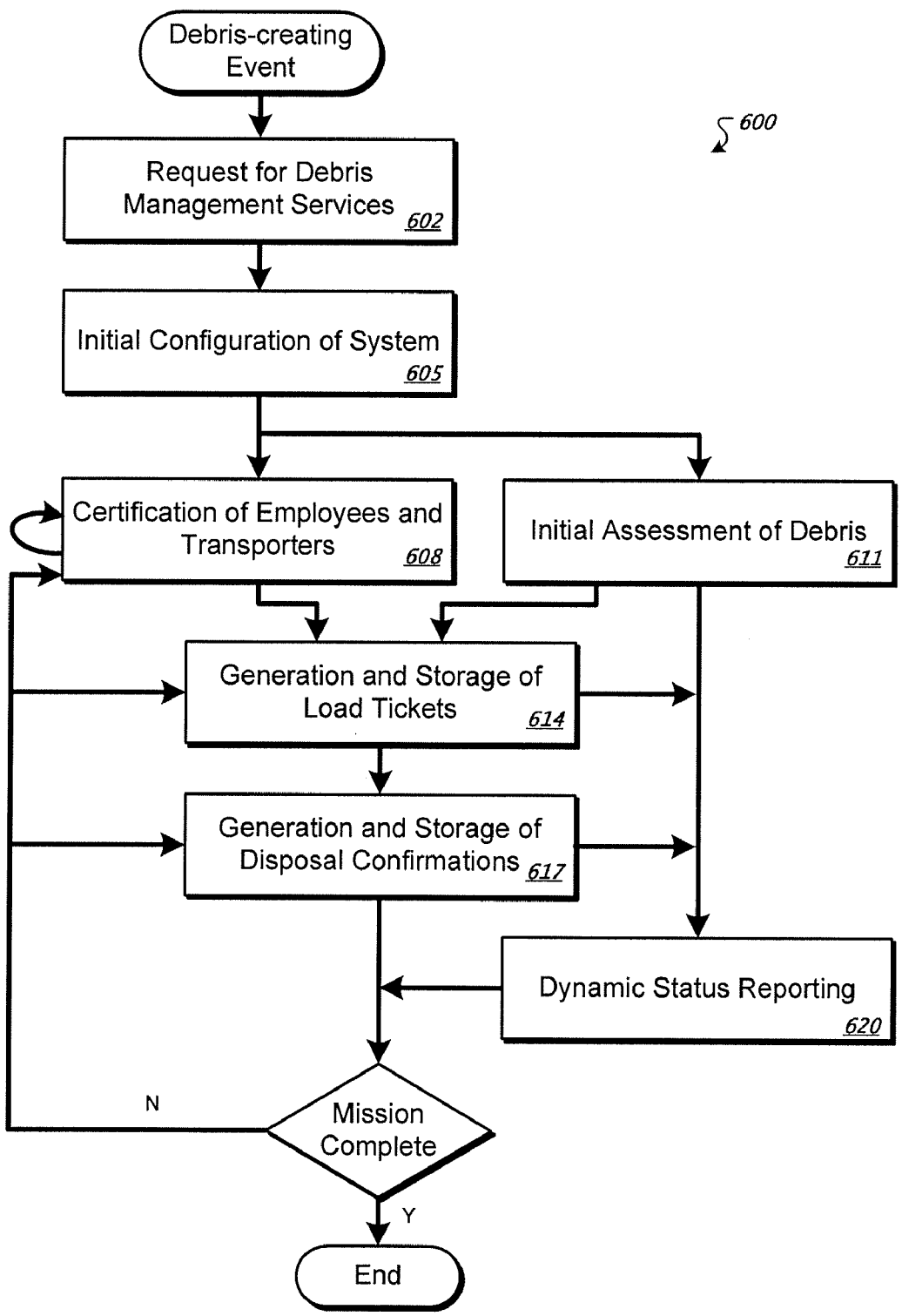
FIG. 6 is a flow diagram illustrating various stages of an example debris clean-up operation.

FIG. 6 is a flow diagram illustrating various stages of an example debris clean-up effort 600. As depicted in one implementation, the clean-up effort 600 is initiated by a debris creating event. For example, a hurricane or tornado could pass through an area, creating a large amount of debris; operations at a military or industrial site could, over time, result in various unwanted material (e.g., unexploded ordinance, hazardous chemicals, radioactive material, etc.) being disposed over an area; an oil or gas leak could cause a large amount soil to be contaminated; etc.

Entities affected by the debris-creating event can request (602) debris management services from an entity providing the systems and methods described in this document. In particular, for example, municipal entities, such as cities or counties affected by the debris-creating event can request debris management services. In one scenario, an environmental consulting firm can provide various services and equipment to support a clean-up operation, including for example, software and hardware systems to receive, store, and analyze information associated with the clean-up operation. Other entities may eventually access the same debris management services, such as, for example, state or federal agencies that may partially find or audit the debris clean-up effort.

A system that provides the requested services can be initially configured (605). In particular, for example, information about the applicant requesting the services (e.g., a city or county) can be entered into the system, and various other information can be customized for the applicant, such as maps relating to the specific area affected by the debris-creating event. More particularly, GIS information can be configured, and specific GIS layers can be registered in the system, including, for example, county boundaries, hydrology information, street data, property parcel information, classification information associated with roads or parcels (e.g., federal, state, county, or private land), and other available and optional information (e.g., census data, political districts, identification of subdivisions or gated communities, etc.). In addition, information about any known participants in the underlying debris clean-up effort can be entered. For example, information about primary hauling contractors can be entered, and employees and transporters associated with the primary hauling contractors can be certified (608). Certification (608) can, in some scenarios, be an ongoing process, as primary contractors hire additional subcontractors having employees and transporters which may also need to be certified. Initial debris sorting or processing sites (TDSRS sites, or disposal sites) can be identified and registered on a GIS layer.

Optionally, an initial assessment of debris can be made (611) with varying levels of precision. For example, in some scenarios (e.g., in cases where debris is scattered across a large area), initial assessments can be made by teams that fly over the debris field. In other scenarios, a ground-based assessment team may survey a debris field on foot, and may at that point begin gather data about specific debris items and even begin tagging the debris items. The initial debris assessments can also be associated with a separate GIS layer (e.g., to facilitate various selection, filtering and analysis operations, which are described in more detail below).

During the primary phase of the example clean-up operation, load supervisors can use the tools described above to generate (614) electronic load tickets for specific debris items to be processed or removed by haulers/transporters that have been assigned the tickets. The electronic load tickets can be stored (614) on portable electronic devices carried by the haulers/transporters (e.g., a ticket device, such as the ticket device 305), with the debris items themselves, between debris and disposal sites. At disposal sites, disposal supervisors can generate and store (617) disposal confirmations corresponding to the electronic load tickets. The disposal confirmations can close out electronic load tickets, and can include confirmations that the processing or removal operations corresponding to the electronic load tickets have been properly carried out.

Figure 7:
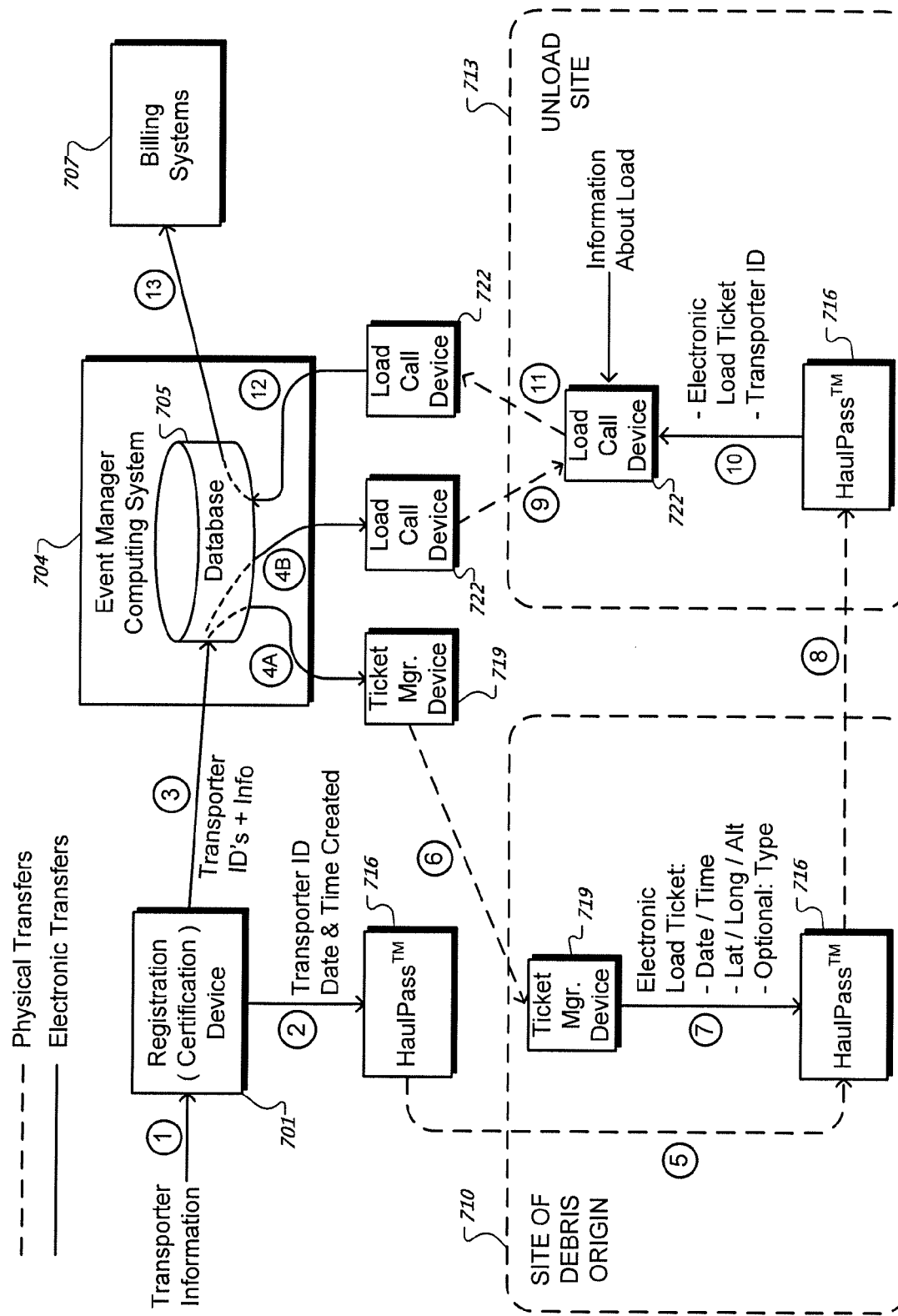
FIG. 7 is a diagram illustrating additional details of an example debris clean-up operation.

FIG. 7 illustrates a specific example implementation of a debris management system that employs a smart card-based portable electronic device for storing ticket information, referred to as a Haulpass™ device, or simply a Haulpass™. In particular, FIG. 7 illustrates various components of a Haulpass™ system, and depicts the flow of information and materials within such a Haulpass™ system. To depict the transfer of electronic information, FIG. 7 employs solid lines; to depict the movement of physical materials, FIG. 7 employs dashed lines. For purposes of illustration, correlations between components of the specific implementation shown in FIG. 7 and more general implementations depicted in other figures are noted parenthetically.

As shown in FIG. 7, a system can include a registration, or certification, device 701. This may be, for example, a personal computer in which information can be entered by a user. In some implementations, the registration device 701 provides the functionality associated with the certification manager module 210 that is shown in and described with reference to FIG. 2. The system also includes an event manager computing system 704 (e.g., the event manager device 117) that provides the central computing system in which information documenting the load transfer process is stored and made available for viewing by various stakeholders in an operation and to other systems (e.g., for approval and billing processes). In addition, there is a billing system 707, and perhaps multiple billing systems, to which the event manager computing system 704 communicates information so as to effectuate payment to parties performing debris hauling services.

FIG. 7 depicts a site of debris origin 710 (e.g., the debris site 101), as well a disposal, or unload site 713 (e.g., the disposal site 104)—which is, in some cases, referred to as a temporary debris storage and reduction site (TDSRS). TDSRS sites can be geographic locations where debris from an event such as a hurricane is collected for temporary processing (e.g., vegetative matter may be hauled to various TDSRS sites, where it can be efficiently shredded or otherwise processed before being disposed of, possible at another site).

FIG. 7 shows portable computing devices (e.g., a ticket manager device 719 and a load call device 722) and a storage device 716 that can be used in the debris management process. In some implementations, the portable storage device 716 (referred to hereafter in this example as the HaulPass™ device 716), can be carried by a person driving a transporter from a site of debris origin 710 to an unload site 713. In some implementations, the HaulPass™ device 716 is a small device that can be carried by a person, for example, in a pocket or in the person's hand (e.g., a smartcard or RFID-based device).

In some implementations, the ticket manager device 719 is a personal digital assistant (PDA) device (e.g., the input device 123). The ticket manager device 719 can include a smart card interface, read/write memory components, and global positioning systems (GPS) components. The load-call device 722 (referred to alternatively as a "tower manager device" 127) can also be a hand-held device, such as a PDA having components similar to the ticket manager device 719 (without the GPS components, in some implementations). In some implementations, the ticket manager device 719 is used at the site of debris origin 710 to issue electronic load tickets that are downloaded to the HaulPass™ device 716. The load call device 722 (tower manager device 722), can be used in the scenario depicted in FIG. 7 to retrieve information from the HaulPass™ device 716, and then provide that information to the event manager computing system 704.

An example process flow is now described of how the components introduced above can be used during the process of debris clean-up, following a catastrophic event such as a hurricane. For purposes of illustration, various actions in the process flow are identified with circled numbers in FIG. 7, and the numbers are referenced in the description that follows. Starting with reference 1, the process can begin with information about a transporter, or vehicle, being entered in the registration or certification device 701. The transporter in this example could be a dump truck or some other vehicle that is able to transport debris from a site of origin 710 to an unload site 713. During this process of registration, information such as the load carrying capacity of the transporter can be entered into the registration device 701. At reference 2, transporter information can downloaded from the registration device 710 to the HaulPass™ device 716. In various implementations, this information can include a transporter identification, or vehicle identification (ID) number and date and time information as to when the information was downloaded to the HaulPass™ device 716. The person responsible for driving the transporter can carry the HaulPass™ with him or her to the site of debris origin 710, as indicated by reference number 5. As shown in FIG. 7, the dotted line next to reference 5 indicates that the HaulPass™ 716 is physically transferred from the point at which the information is downloaded to the device 716 at reference number 2 to the site of debris origin 710.

In addition to being downloaded to the HaulPass™ device 716, the transporter identification and other information can be transferred from the registration device 710 to the event manager computing system 704, as indicated by reference 3, so that this information may be subsequently available for downloading to the ticket manager device 719 and the load call device 722, as shown by references 4A and 4B.

As shown in FIG. 7, the ticket manager device 719 can also be physically transported to the site of debris origin 710 (e.g., by a field supervisor or field monitor assigned to the device 719). In other implementations (not shown), the ticket manager device 719 may not need to be transported to the site of debris origin 710. For example, a wireless or other communication infrastructure may still be intact following a catastrophic, debris-creating event, and the intact communication infrastructure may be employed to transfer information from the event manager computing system 704 to the ticket manager device 719. Thus, for example, the download of the transporter ID's and other information shown at reference numbers 4A and 4B to the ticket manager device 719 and the load call device 722 may be done with a hard-wired connection between the event manager computing system 704 and the appropriate hand-held device (e.g., with devices at the site of an event manager computing system 704 or at some other client device that can be communicatively coupled to the event manager computing system 704) or alternatively may be done over wireless communication infrastructure, if such infrastructure is still intact and operational.

Turning to the site of debris origin 710, the ticket manager device 719 can download to the HaulPass™ device an electronic load ticket. That is, a load supervisor who is overseeing a debris loading operation at the site of debris origin 710 can use the ticket manager device 719 to create an electronic load ticket, then download the electronic load ticket to the HaulPass™ device 716 of a load hauler who has been assigned the load ticket (or more particularly, the HaulPass™ device associated with the load hauler's transporter).

In some implementations, the electronic load ticket includes, as depicted in FIG. 7, a date and time as to when the electronic load ticket was created, geospatial information that describes the site of debris, and optionally a type indicator that indicates the type of debris that is being transported (e.g., ROW debris, white goods, etc.). The geospatial information can be obtained from GPS components included in the ticket manager device 719, and may specifically include latitude, longitude, and elevation information about the debris specifically or the general site of debris origin 710. The type information can include, for example, the following types: right-of-way (ROW; e.g., debris that is currently blocking a public road or other pubic space, or is otherwise accessible from a ROW), right-of-entry (ROE; e.g. debris that may only be accessible from a location that is not within a ROW, such as private property), stump, car, boat, leaner, or hanger. A "leaner" or a "hanger" can be a debris type that describes a tree that has been wind damaged, and although not blown down, may be leaning severely or hanging over power lines so as to cause a hazard.

As will be described later, some of the electronic load tickets corresponding to certain debris types may require a confirmation at the unload site 713 as to the percentage full the transporter, or vehicle. For example, the transporter may be 70% full or 100% full, and this information may be required in order to close out an electronic load ticket. Other units can also be used, such as pounds, tons, cubic yards, or other units of measure that the system is configured to handle. Other types of load tickets, such as a stump type, may only require at the unload site a confirmation that a stump was in fact in the load. Other types of load tickets, such as load tickets for white goods or other per-item debris may require an appropriate unit (e.g., one car, two boats, five white goods, etc.).

Once the driver of the transporter has gotten the load ticket downloaded to his or her HaulPass™ device, and has the load in his or her transporter, the driver can drive the transporter to an appropriate unload site 713. In this example, as depicted by reference 8, the driver carries the HaulPass™ along with the load to the unload site 713.

In scenarios in which access to the unload site 713 is controlled, the driver may be allowed to enter the unload site 713 because of having a recognizable placard on the side of the transporter showing that the vehicle is one that has been registered and thus authorized to enter the unload site. Such a placard may have been issued for the transporter at the time of registration.

Once at the unload site 713, the driver can provide the HaulPass™ device to a disposal supervisor, who can use the load call device 722 to upload (reference 10) information stored on the HaulPass™ device 716 (e.g., the electronic load ticket corresponding to the load in the transporter, as well as transporter identification or vehicle identification information) to the load call device 722. In some implementations, after the load call device 722 uploads information from the HaulPass™ device 716, the electronic load ticket information on the HaulPass™ device 716 can be erased. (Note, however, that the transporter identification information on the HaulPass™ device 716 is not generally erased at this time.)

The unload supervisor at the unload site 713 can inspect the transporter and the load in the transporter. In some scenarios, the unload supervisor is referred to as a "tower monitor" because this person may occupy a tower so as to be able to view the contents of transporters as they pass under the supervisor, and thus determine the percentage full the transporter is or confirm that certain contents are in the transporter (e.g., a stump). Based on the inspection of the transporter and its contents, the tower manager can enter information into the load call device 722 that may be necessary to close out the uploaded electronic ticket. With some loads, as indicated above, this information can include a percentage to which the transporter was filled; with other types of loads, such as stump loads, the information can include a confirmation that the load included one or more stumps and may optionally include a confirmation of corresponding stump sizes, if such information is included in the electronic load ticket.

As indicated by reference number 4B, the load call device 722 can have stored on it (or can otherwise access) the transporter's ID and information about the transporter, for example, the size and load carrying capacity of the transporter. This information may be displayed to the tower manager by the load call device, so that the tower manager at the unload site may confirm that the HaulPass™ device is being carried by, and is associated with, the correct transporter. Such a confirmation can minimize fraud by, for example, making it difficult for transporter companies or people to register large load carrying transporters but subsequently use smaller load carrying transporters to get credit for hauling more material than is actually hauled.

At different times (e.g., after one or more electronic load tickets and transporter ID's have been loaded onto the load call device 722, or at a certain time every day) information on the load call device 722 can be uploaded to the event manager computing system 704, as indicated by reference number 12. In scenarios where a communication infrastructure is still intact and available at the unload site 713, this information may be uploaded by wired or wireless communication from a computer device to which the load call device 722 may be connected (e.g., a docking station), or directly if the load call device 722 is equipped with communication facilities. Alternatively, the load call device 722 may be physically transported to a location where the information can be uploaded.

As is described in more detail below, once information has been provided to a database 705 in the event manager computer system 704, the event manager computing system 704 can make the information available for viewing by many different parties who need access to the information (e.g., stakeholders in the overall clean-up effort). For example, FEMA personnel may need to view the information to verify its correctness. In addition, state, federal and other authorities may need to view the information to determine whether it is information that is in the right format to be reimbursable. The information can also be provided, as depicted by reference number 13, to billing systems 707 so that payment can be effected to the persons or companies providing the transporter services.

The event manager computing system 705 can use the geospatial data that is included in load tickets for various auditing and reporting functions. In particular, the event manager computing system 704 can use this information to determine an address from which the debris was obtained. The event manager computing system can then make that address available, and associated it with, the corresponding load when such information is required during an approval process. For example, FEMA regulations may require that address information be provided for each of FEMA-reimbursable load tickets. Accordingly, the event manager system 704 can be configured to automatically generate this information. Other systems may also use such geospatial information for various downstream confirmations or processing.

As indicated above, the event manager module 207 (e.g., running on the event manager device 117), can provide various reporting and auditing functions as information is entered in the system. FIGS. 8A-8B, 9A-9C and 10 illustrate various example user interfaces that can provide example reporting and auditing functions.

Figure 8A:
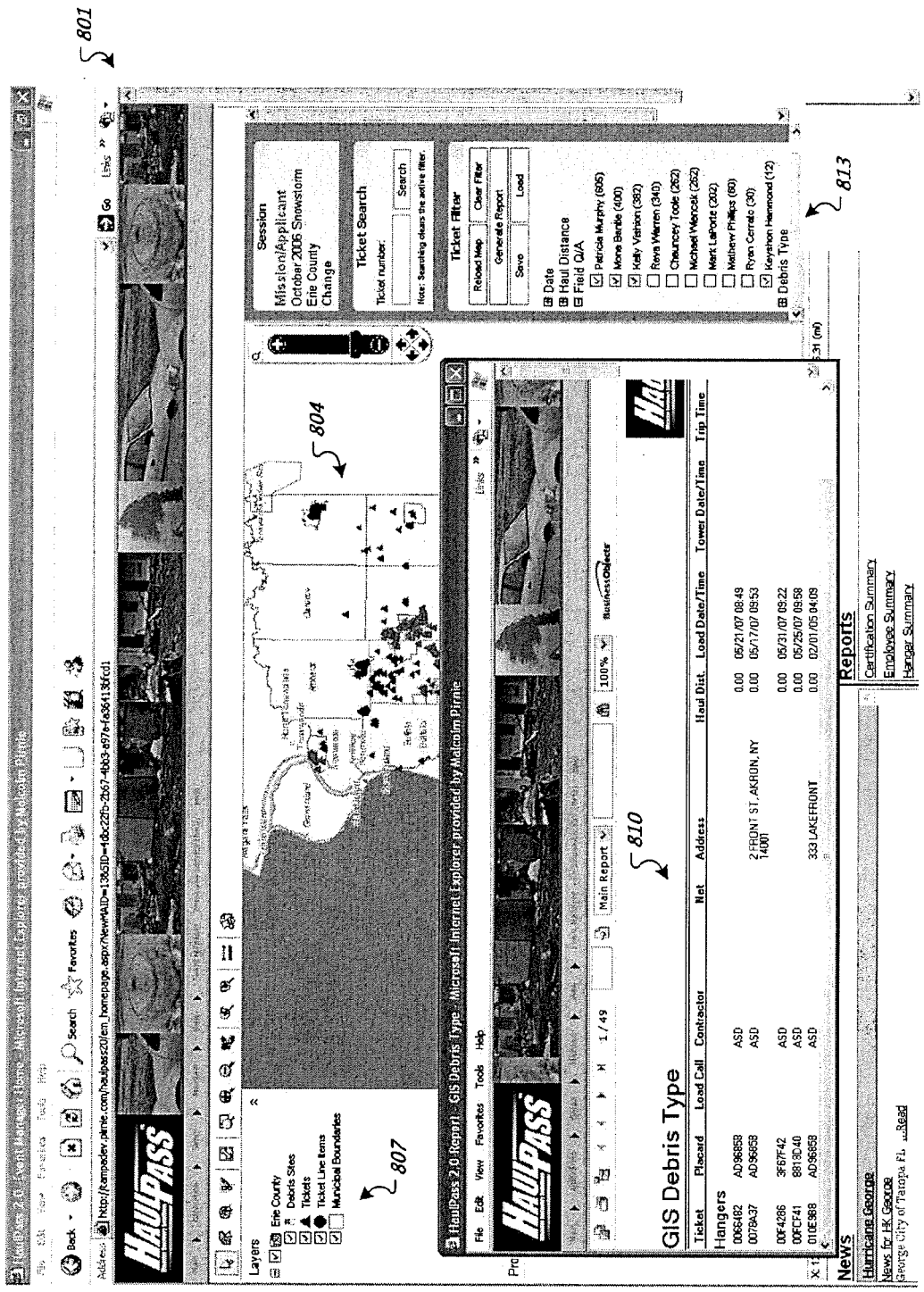
FIG. 8A illustrates an example user interface that can display geographic data and data related to a debris clean-up operation.

FIG. 8A illustrates a user interface 801 in which data related to a debris clean-up effort is combined with various geospatial information. In some implementations, the user interface 801 can be displayed locally to an administrator working directly with the event manager device 117 (shown in FIG. 1), or the user interface 801 can be displayed to various stakeholders to a clean-up operation at a remote terminal (e.g., one of the terminals 137, 140 or 144). In the latter cases, the actual information displayed may be filtered based a role of a corresponding user in the clean-up effort. For example, a user associated with FEMA who is accessing the user interface 801 from the remote terminal 145 may have access to a majority of the information related to an overall clean-up effort, which FEMA may partially fund. In contrast, an individual hauler or transporter driver may be able to access only a small amount of clean-up information from the remote terminal 137 (e.g., information that is limited to a specific debris clean-up route assigned to him or her).

As depicted in FIG. 8A, the example interface 801 can display graphical map information in a map pane 804. The map information may include various layers of information (e.g., layers corresponding to the GIS system 130, or data that is otherwise associated with a particular layer—GIS or otherwise). In some implementations, the layers can facilitate filtering and selection of particular data and can be useful to customizing the information displayed by the user interface 801. Individual layers or groups of layers may be selectable with various layer selection controls 807 and ticket filter controls 813. Selection of a particular layer can cause information associated with that layer to be displayed. For example, as shown in FIG. 8A, layers for debris sites, tickets, and municipal boundaries are selected (among other layers), and accordingly, debris site, ticket location and municipal information is displayed in the map pane 804. The layers may be grouped in a manner that permits detailed information associated with individual layers in the group to be expanded or collapsed. For example, individual field monitors can be shown as grouped in a "Field QIA" group (in the ticket filter controls 813), which is currently shown as expanded. In some implementations, expanding a group permits individual layers within a group to be individual selected or excluded from the map information 804. Groups can be collapsed to facilitate efficient layer management.

In some implementations, most data that is received by the event manager device 117 (shown in FIG. 1), is assigned a layer. The data may be assigned to an existing layer in the GIS system 130, or the data may be assigned a new layer in a manner that allows the data to be displayed with other geospatial information (e.g., the data can be coded with geographical coordinates as necessary to enable it to be displayed on a map). The resulting combination of debris-related data and geospatial data can facilitate powerful analysis, auditing and drill-down capabilities. For example, when a new employee is certified, that employee can be added to an appropriate existing or new layer, such that any information associated with that employee can be selectively displayed in the user interface 801. As a more particular example, after specific employees are certified, information associated with those employees can be selected. That is, selection of particular field monitors can, for example, cause electronic load tickets generated by those field monitors to be displayed in the map pane 804. Similarly, as soon as a particular TDSRS site is registered, information about that TDSRS may be individually selectable. In general, any kind of data may be assigned to a layer, and the event manager device 117 may be configured to automatically assign data to an existing or new layer upon receiving the data.

Layer information, for example ticket information, can be filtered, using various filters in a filter pane 813. For example, ticket information can be filtered by date, haul distance, debris type and field monitor. As shown, the filter pane 813 shows filters selected to filter tickets by particular field monitors (shown in FIG. 8A in the "Field Q/A" expandable group); accordingly, the ticket information shown in the map pane 804 includes ticket information associated with selected field monitors (i.e., tickets associated with "Patricia Murphy," "Mona Bantle," "Kelly Vishion," or "Keyshon Hammond").

One drill-down feature that can be supported by the interface 801 is providing additional information associated with various map elements in a separate information pane 810. For example, as shown in FIG. 8A, the information pane 810 displays load tickets having a debris type of "hangers". The actual information displayed in the information pane 810 can, in some implementations, depend on various layer controls 807 or 813 that are activated, or on various graphical representations (e.g., icons) that are selected in the map pane 804. For example, unselecting the "Tickets" layer in the layer controls 807 may cause the information pane 810 to go away; as another example, selecting a particular ROW Zone in the layer controls 807 may cause the information pane 810 to display information about load tickets that have been generated for that particular ROW Zone.

Figure 8B:
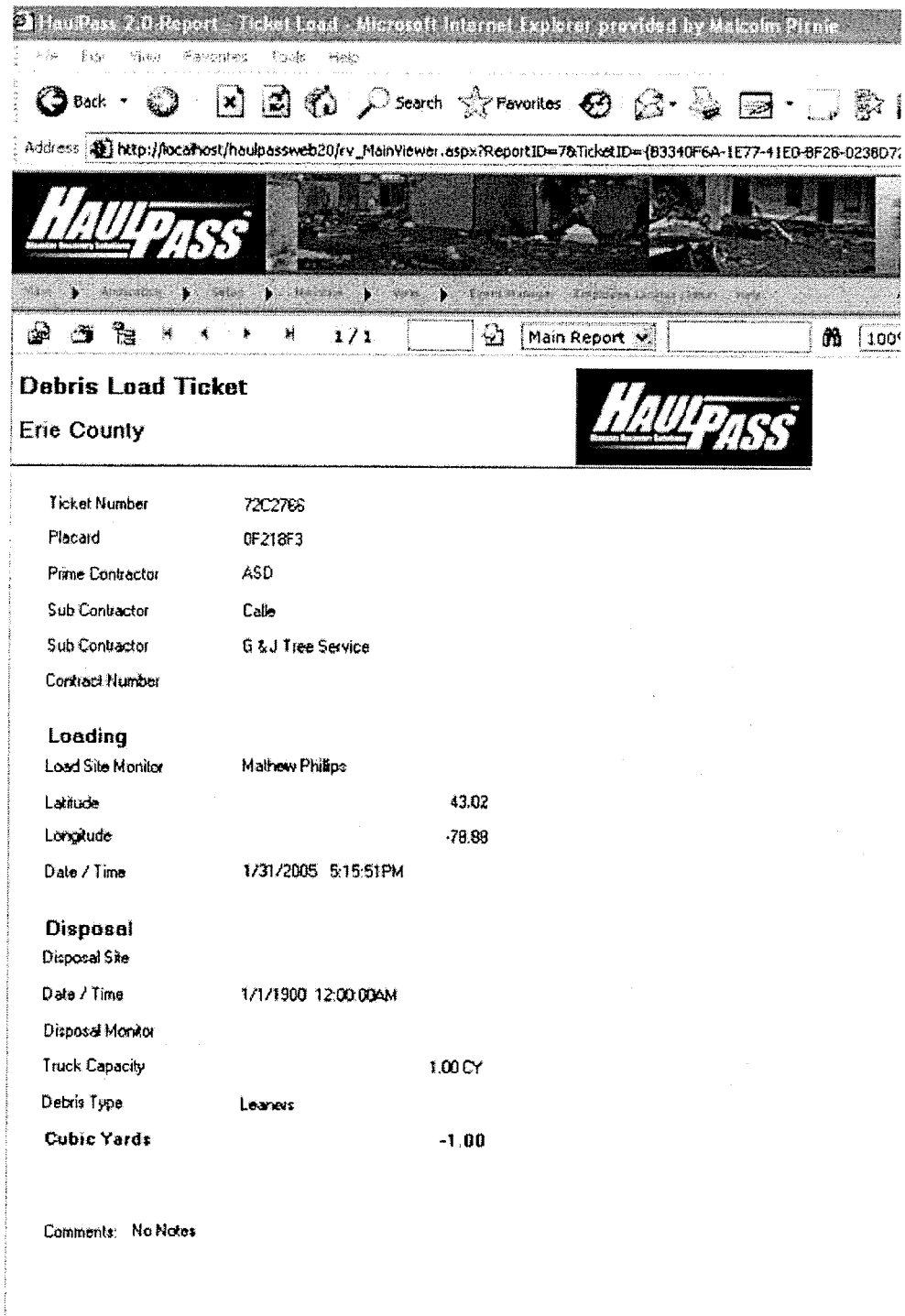
FIG. 8B illustrates an example user interface that can display additional detail for data displayed in the user interface of FIG. 8A.

The information pane 810 can support additional drill-down of data. For example, each load ticket in the load ticket report that is shown (e.g., "GIS Debris Type" report) in the information pane 810 may be selectable, and upon selection, may cause information specific to that load ticket to be displayed (e.g., in the information pane 810, or in a separate window, or portion of the user interface 801). FIG. 8B illustrates an example display 820 that may be provided upon selection of an individual load ticket (e.g., in the information pane 810). As shown in FIG. 8B, the display 820 can include various information about the selected load ticket, such as a placard identifier corresponding to a transporter to which the ticket was assigned, contractor information, information about a load supervisor (load site monitor) who created the ticket, a location, and time stamp, and information about where and when the ticket was closed. Debris information can also be displayed, such as a debris type and amount, which may include a calculated amount and the basis for the calculated amount (e.g., a transporter capacity and corresponding fill percentage (not shown in FIG. 8B, since leaners may not be measured by volume)).

Other status or analysis information can also be presented. For example, in some implementations (not shown), the display 804 can indicate that a debris location is "INVALID." This status information could have resulted from an audit that was automatically performed by the event manager device 117, and may identify a possibly fraudulent ticket. For example, if the event manager determines that the ticket was for "Construction and Demolition" debris, but that the location corresponds to a body of water, the system may flag the load ticket for further investigation; in such a case, the flag may highlight a legitimate processing error, or the flag may facilitate the identification of fraud.

In addition to providing information about load tickets that have been closed, other interfaces can provide various analysis, planning and auditing reports. Various example reports are illustrated in and described with reference to FIGS. 9A-9C and FIG. 10.

Figure 9A:
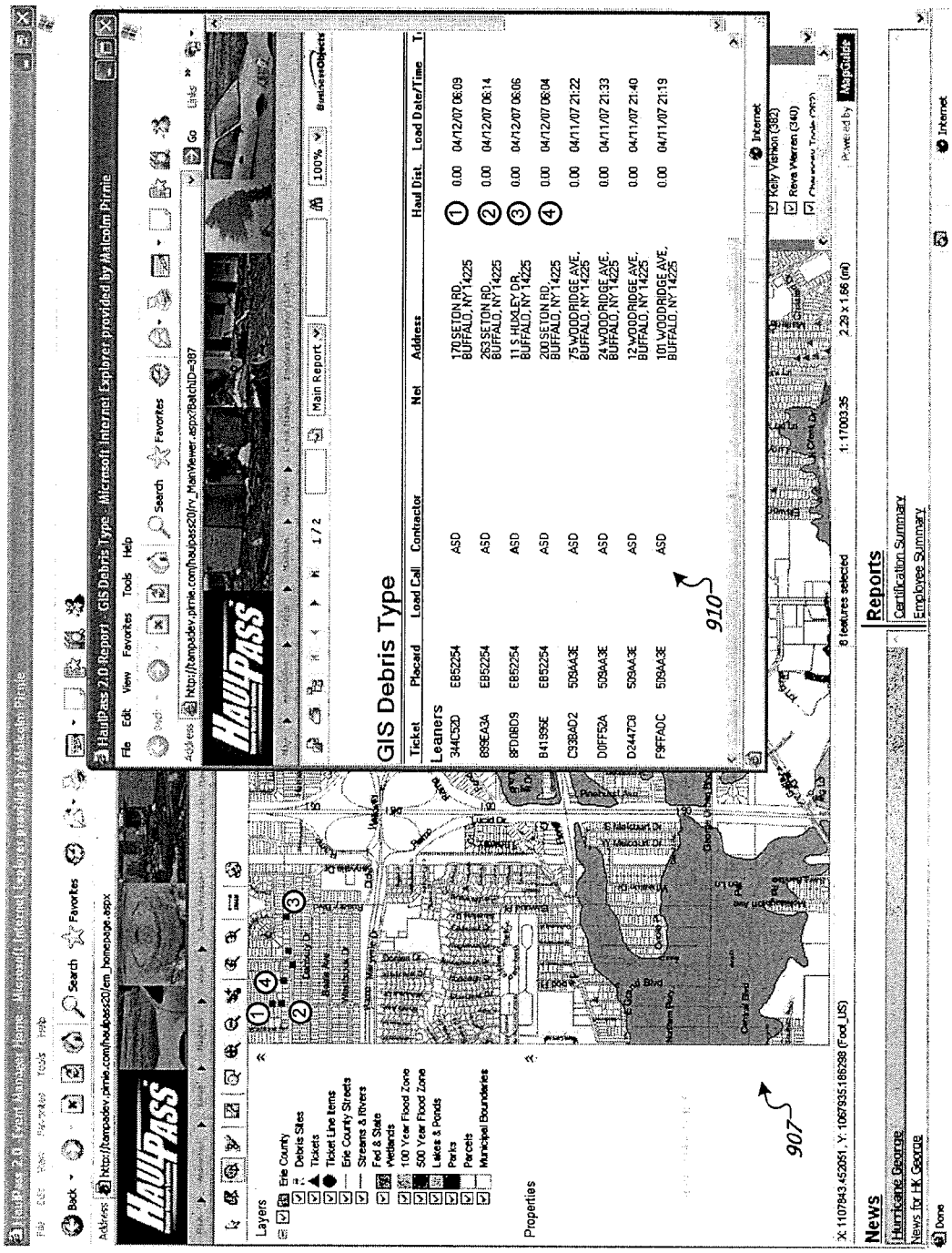
FIGS. 9A-9C illustrate example user interfaces that can display auditing or planning reports.

FIG. 9A illustrates an employee location audit report 904 that can be used to track specific employees locations throughout a day. Such a tool can be used for management purposes, and the tool can also be used to identify suspicious or unapproved activity on the part of employees in the system. Data to create such a report can come, for example, from the timesheet tracking modules 228 and 244 described with reference to FIG. 2. As shown, the report 904 can include a map pane 907 and a corresponding information pane 910. In this example, the map pane displays consecutive locations that haulers with placards "EB52254" and "509AA32" were tracked at, and the information pane 910 displays timestamp information about each location.

In some implementations (not shown), such a report could be used to highlight unauthorized or suspicious locations for particular haulers; alternatively a report like that shown in the information pane 910 could be used to identify possibly fraudulent entries. In particular, for example, entries associated with a single hauler or employee that have timestamps within a small range in time but location data that indicates travel over a large geographic area are improbably and may suggest that an employee badge or a portable electronic storage device have been compromised. Similarly, too many entries within too short of a time period may suggest collusion between a hauler and a field or disposal supervisor. Information and reports such as those depicted in FIG. 9A may be useful in identifying suspicious or fraudulent activity.

Figure 9B:
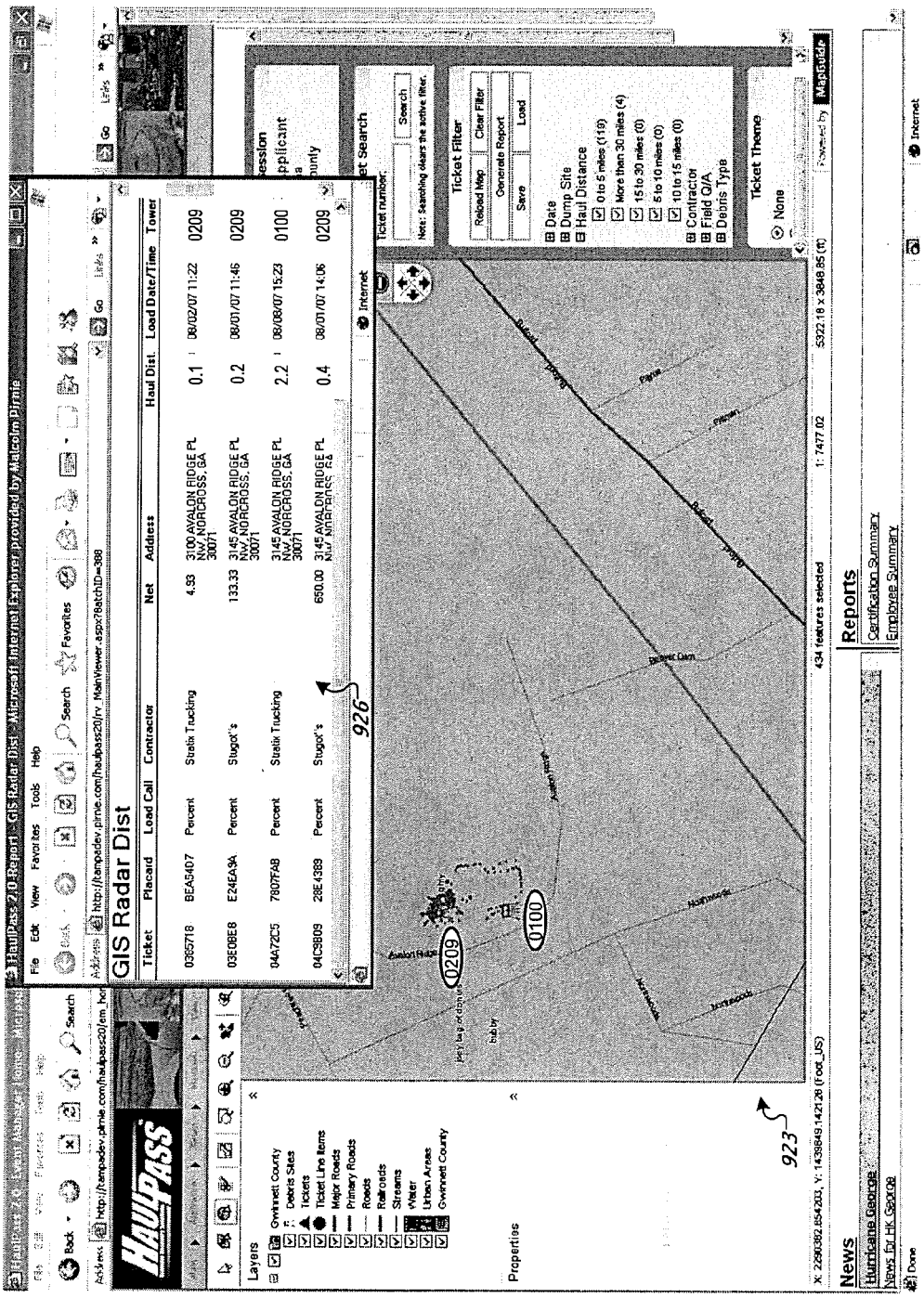

FIG. 9B illustrates an example efficiency audit report 920 that can be used, for example, to determine whether specific load tickets were processed in the most efficient manner possible. Such an audit report could be used, for example, to identify inefficient haulers. In this example, specific debris sites are mapped in a map pane 923, along with corresponding TDSRS sites at which the debris was unloaded. An information pane 926 displays calculated distance between the TDSRS site and the site of origin for the debris. As shown in the information pane 926, the debris identified by "04A72C5" was not disposed of at the nearer TDSRS site "0209," but rather taken to the farther TDSRS site "0100." Such information could be useful, for example, in identifying inefficiencies in a clean-up operation, educating or managing specific haulers, or adjusting payments based on unapproved actions taken (e.g., longer-than-necessary routes in order to collect a "long haul" rate). The examples in FIG. 9B are merely representative; they show relatively short distances, but the reader will appreciate that the audit concepts can be extended to greater geographic areas and larger data sets.

Figure 9C:
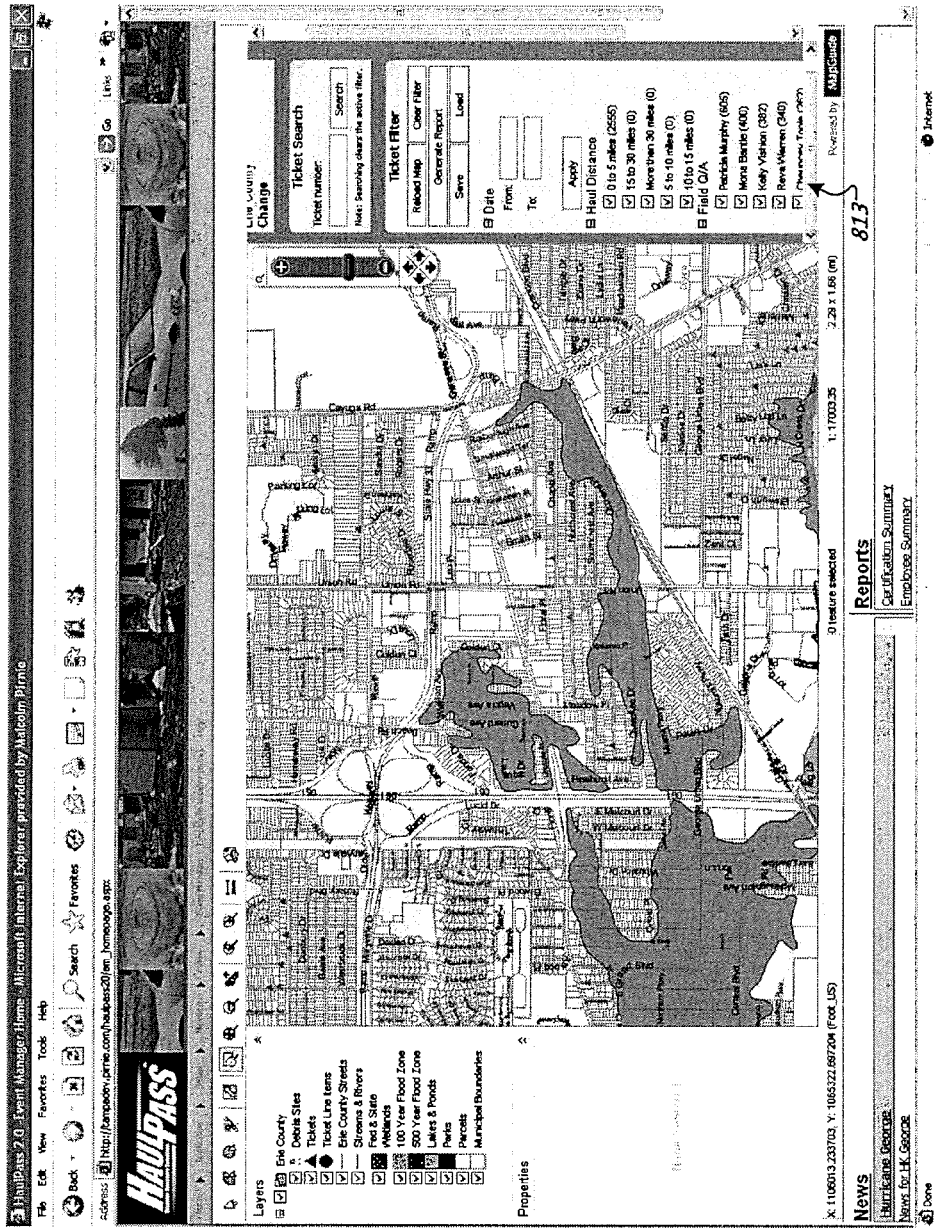

FIG. 9C illustrates another example interface 940 illustrating additional example filtering capabilities. For example, the filter pane 813 includes controls which can allow a user to filter tickets based on haul distance from the debris location to the TDSRS site (e.g., haul distances of 0 to 5 miles, 5 to 10 miles, 10 to 15 miles, 15 to 30 miles, or more than 30 miles).

Figure 10A:
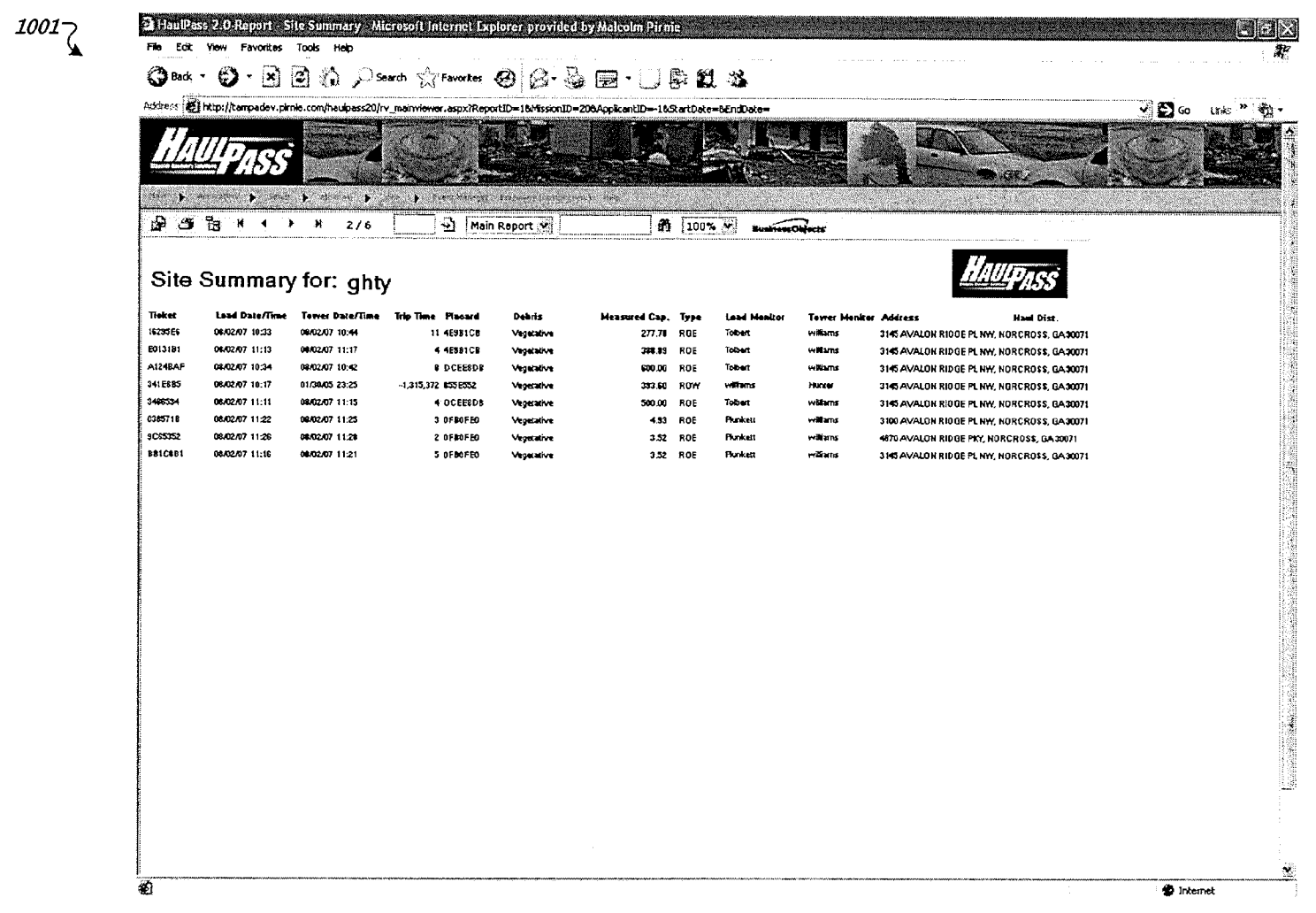
Figure 10B:
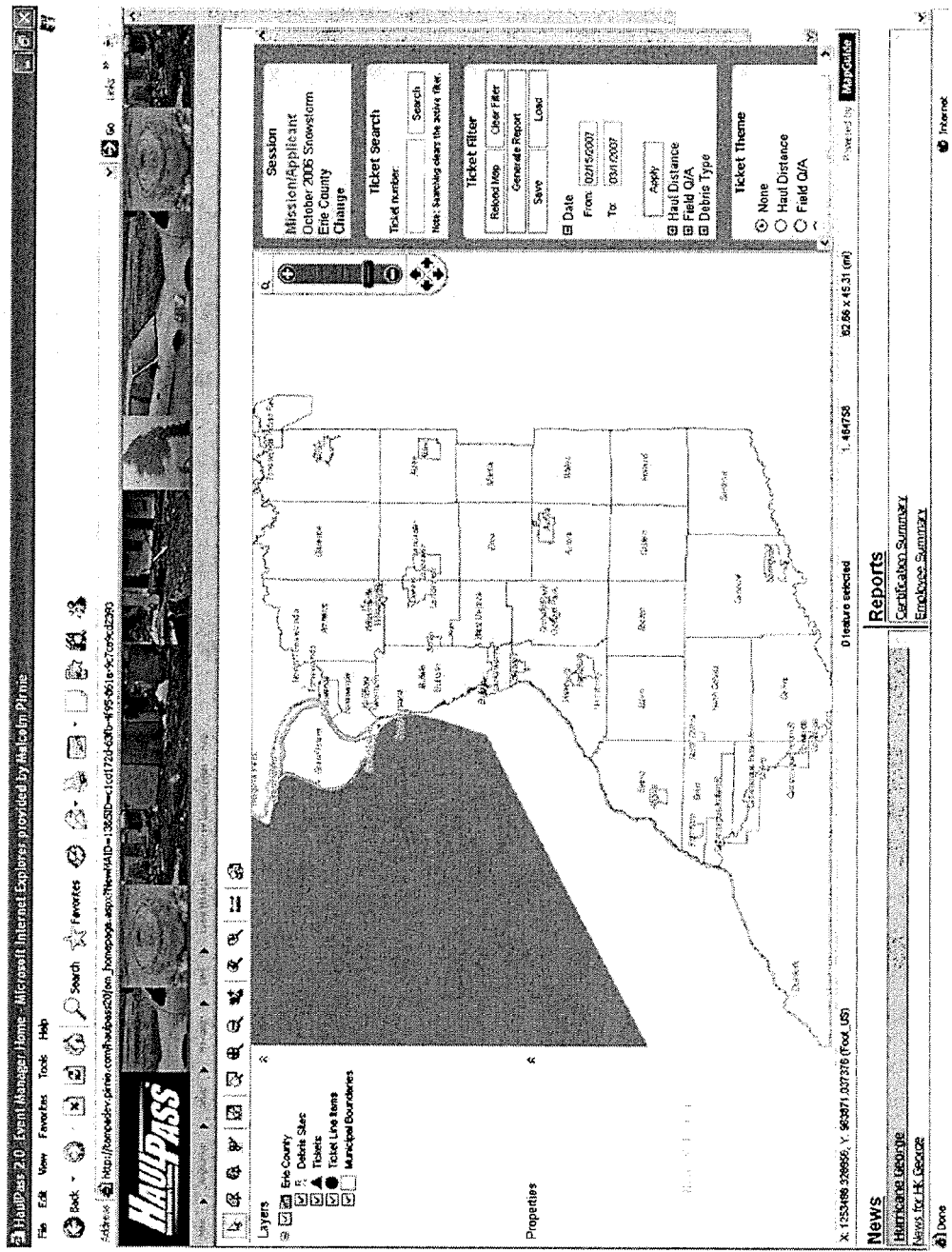
FIG. 10B illustrates another example interface, from which the report shown in FIG. 10A can be launched.

FIG. 10A illustrates an example summary report 1001 for a particular disposal site. In some implementations, a summary report such as the summary report 1001 can be displayed in response to user selection of information or symbols in other user interfaces, such as, for example a symbol that represents the corresponding disposal site in the user interface 801 that is shown in FIG. 8A. In other implementations, the summary report 1001 can be displayed in response to user selection of various filtering or reporting options in another interface, such as, for example, the interface 1020 shown in FIG. 10B. The example summary report 1001 provides another example of drill-down detail that the event manager device 117 can provide, namely, cumulative information for a particular site, within a particular time frame (note date time filter depicted in FIG. 9C).

Various other summary reports and drill-down features are contemplated and are within the spirit of the disclosed implementations. Moreover, drill-down features that enable users to select various information in a user interface can be enabled for many different kinds of data stored in the systems described in this document.

In general, a number of implementations have been described for purposes of illustration. Nevertheless, it will be understood that various modifications may be made without departing from the spirit and scope of the disclosed implementations. For example, the systems and methods described can be used for more than just natural disaster debris cleanup, such as tracking processing of unexploded ordinance, hazardous chemicals, radioactive material contaminated soil, or bulk material, such as dirt, clay, stone or other material, to name a few examples. As such, "debris" can be representative of any other kind of material that might be tracked. Accordingly, other implementations are within the scope of the following claims.

What is claimed is:

1. A computer-implemented method of performing debris clean-up following a disaster event, the method comprising:
   pre-registering a debris transporter and storing a registration identifier that uniquely identifies the debris transporter in a portable electronic information storage device;
   creating an electronic load ticket for the pre-registered debris transporter to transport a load of debris from a site of debris origin to a second site where the load of debris is to be emptied from the transporter, the electronic load ticket including information identifying the geographic location of debris origin, and being electronically stored on the portable electronic information storage device that contains the registration identifier that uniquely identifies the pre-registered debris transporter;
   following the arrival at the second site of a debris transporter carrying a load of debris and the portable electronic information storage device, reading, from the electronic information storage device and to a portable computing device, the stored registration identifier and the electronic load ticket; and
   upon verifying that the transporter that has arrived at the second site is the pre-registered debris transporter corresponding to the registration identifier read by the portable computing device, receiving at the portable computing device information describing the load of debris that has been transported.

2. The method of claim 1, wherein the registration identifier includes information indicating a load carrying capacity of the debris transporter.

3. The method of claim 1, wherein the transporter that arrived at the second site is verified as the pre-registered debris transporter using, at least, the registration identifier.

4. The method of claim 3, wherein the registration identifier stored in the portable electronic information storage device during the step of pre-registering the debris transporter is made accessible to the portable computing device at the second site where the load of debris is to be emptied from the transporter without the use of a telecommunications network.

5. The method of claim 4, wherein the registration identifier stored in the portable electronic information storage device during the step of pre-registering the debris transporter is physically transported to the second site where the load of debris is to be emptied from the transporter using the portable electronic information storage device.

6. The method of claim 1, wherein the electronic load ticket further including information uniquely identifying a monitoring person responsible for monitoring at the site of debris origin.

7. The method of claim 6, further comprising receiving at the portable computing device the information uniquely identifying the monitoring person responsible for monitoring at the site of debris origin.

8. The method of claim 1, further comprising loading into a central database the information received at the portable computing device describing the load of debris that has been transported and the associated electronic load ticket.

9. The method of claim 8, further comprising using the information loaded into the central database to determine monetary compensation for debris transport services using the transporter.

10. The method of claim 1, wherein the information identifying the site of debris origin comprises geographic location information obtained from a device containing global positioning system information.

11. The method of claim 10, wherein the geographic location information comprises latitude and longitude information.

12. A computer-implemented method of tracking a clean-up operation, the method comprising:
   receiving, by a portable electronic storage medium, a registration identifier that uniquely identifies a material transporter vehicle with which the portable storage medium is associated;
   receiving, by the portable electronic storage medium and at a site of material origin, electronic load ticket information characterizing material that is to be loaded into the material transporter vehicle and conveyed to a site of material disposal and storing the electronic load ticket information in the portable electronic storage medium; and
   upon arrival of the material transporter vehicle and the portable storage medium at the site of material disposal, receiving, by the portable electronic storage medium and from an electronic device at the site of material disposal, a request for the registration identifier and the electronic load ticket information, and providing the stored registration identifier and the stored electronic load ticket information to the electronic device in response to receiving the request, wherein the material transporter vehicle is verified as having transported the material from the site of material origin to the site of material disposal based on the registration identifier provided by the portable electronic storage medium, and wherein material transported to the site of material disposal by the material transporter vehicle is verified as the material loaded into the material transporter vehicle at the site of material origin based on the electronic load ticket provided by the portable electronic storage medium.

13. The computer-implemented method of claim 12, wherein the portable electronic storage medium is selected from the group consisting of a smart card and a radio frequency identification (RFID) device.

14. The computer-implemented method of claim 12, further comprising deleting the electronic load ticket information from the portable electronic storage medium after the electronic load ticket information has been provided to the electronic device.

15. The computer-implemented method of claim 12, wherein the electronic load ticket information comprises location information that identifies a geographic location of the site of material origin and classification information that specifies a type of the material.

16. The computer-implemented method of claim 15, further comprising receiving, by the electronic portable storage medium, from the electronic device, an indication that the classification information accurately characterizes the material that was conveyed to the site of material disposal by the material transporter vehicle and quantity information that specifies an amount of the conveyed material in the material transporter vehicle.

17. The computer-implemented method of claim 12, further comprising encrypting the received electronic load ticket information, wherein storing the electronic load ticket information comprises storing the encrypted electronic load ticket information.

18. A computer-implemented method of tracking transportation of material from a plurality of material origination sites to one or more material disposal sites, the method comprising:

in a computing device at a disposal site, retrieving from a portable electronic storage medium uniquely associated with a registered material transporter vehicle, (i) a registration identifier that uniquely identifies the material transporter vehicle, and (ii) an electronic load ticket corresponding to material that has been transported in the registered transporter vehicle from a site of material origination to the disposal site, the electronic load ticket including information identifying a geographic location corresponding to the site of material origination;

receiving from a user of the computing device input specifying a quantity of the material transported in the registered transporter vehicle and a classification of the material; and providing the registration identifier, the electronic load ticket and the received input to a centralized tracking system, wherein the centralized tracking system is configured to use, at least, the registration identifier to verify that a material transporter vehicle loaded with the material at the site of material origin is the material transporter vehicle that arrived at the disposal site, and wherein the centralized tracking system is configured to use, at least, the electronic load ticket and the received input to verify the material transported from the site of material origin to the disposal site by the material transporter vehicle.

19. The computer-implemented method of claim 18, further comprising providing a signal to the portable electronic storage medium to cause the electronic load ticket to be deleted from the portable electronic storage medium.

* * * * *